United States Patent
Imai et al.

(10) Patent No.: US 8,696,132 B2
(45) Date of Patent: Apr. 15, 2014

(54) IMAGE DISPLAY SYSTEM, IMAGE CONTROL APPARATUS, IMAGE CONTROL METHOD, AND OPTICAL SHUTTER IN WHICH PLURAL KINDS OF INFORMATION ARE MULTIPLEXED AND DISPLAYED ON A DISPLAY SURFACE

(75) Inventors: Masao Imai, Tokyo (JP); Junichirou Ishii, Tokyo (JP); Fujio Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 267 days.

(21) Appl. No.: 13/123,392

(22) PCT Filed: Oct. 9, 2009

(86) PCT No.: PCT/JP2009/067651
§ 371 (c)(1),
(2), (4) Date: Apr. 8, 2011

(87) PCT Pub. No.: WO2010/047241
PCT Pub. Date: Apr. 29, 2010

(65) Prior Publication Data
US 2011/0193880 A1 Aug. 11, 2011

(30) Foreign Application Priority Data
Oct. 20, 2008 (JP) .................................. 2008-269962

(51) Int. Cl.
*G03B 21/14* (2006.01)
(52) U.S. Cl.
USPC .......................................................... 353/20

(58) Field of Classification Search
USPC ............................ 353/31; 345/69; 348/55–58
See application file for complete search history.

(56) References Cited

U.S. PATENT DOCUMENTS

| 4,967,268 | A | * | 10/1990 | Lipton et al. ..................... 348/56 |
| 5,963,371 | A | * | 10/1999 | Needham et al. ............. 359/464 |
| 7,164,779 | B2 | * | 1/2007 | Yerazunis et al. ............. 382/100 |
| 2003/0026449 | A1 | | 2/2003 | Yerazunis et al. |
| 2008/0144967 | A1 | | 6/2008 | Struyk |

FOREIGN PATENT DOCUMENTS

| CN | 1206843 | 2/1999 |
| JP | 62-065580 | 3/1987 |

(Continued)

OTHER PUBLICATIONS

International Search Report, PCT/JP2009/067651, Dec. 22, 2009.

(Continued)

*Primary Examiner* — Thanh Luu
*Assistant Examiner* — Renee Naphas
(74) *Attorney, Agent, or Firm* — Young & Thompson

(57) ABSTRACT

An image display system includes: display unit (13) for spatially combining a first polarized image generated by first polarized light and a second polarized image generated by second polarized light having a polarized light component different from that of the first polarized light and displaying a combined polarized image; display control unit (1) for causing display unit (13) to multiplex-display a plurality of different images in a time division manner concerning each of the first and second polarized images; and optical shutter (14) that selectively transmits only a polarized image corresponding to a selected image arbitrarily selected from among the plurality of different images.

18 Claims, 15 Drawing Sheets

(56) References Cited

FOREIGN PATENT DOCUMENTS

| | | |
|---|---|---|
| JP | 62-091926 | 4/1987 |
| JP | 05-323267 | 12/1993 |
| JP | 6-186506 | 7/1994 |
| JP | 2007-537463 | 12/2007 |
| WO | WO 2008/026403 | 3/2008 |
| WO | 2008066954 | 6/2008 |
| WO | WO 2008/102883 | 8/2008 |

OTHER PUBLICATIONS

CN Office Action dated Oct. 26, 2012, with English Translation; Application No. 200980141725.X.

Official Action dated Apr. 16, 2013 from the Japanese Patent Office in Japanese Patent Application No. 2010-534772 with partial English translation, 3 pages.

* cited by examiner

IMAGE DISPLAY SYSTEM, IMAGE CONTROL APPARATUS, IMAGE CONTROL METHOD, AND OPTICAL SHUTTER IN WHICH PLURAL KINDS OF INFORMATION ARE MULTIPLEXED AND DISPLAYED ON A DISPLAY SURFACE

TECHNICAL FIELD

The present invention relates to an image display system, and, more particularly to an image display system that can select a desired kind of information from a plurality of multiplex-displayed different images and observe the information.

BACKGROUND ART

When a user displays information on a display such as a monitor of a television set or a personal computer and enjoys the information, typically, one kind of information is displayed on the display. When the user displays and obtains different kinds of information, the user switches a channel or switches a window of an application software. In this case, when the user alone uses the television set or the personal computer or when all people want to watch the same information, no problem occurs. However, even if there are requests in which people would like to simultaneously watch different kinds of information, the requests cannot be met. To display a plurality of screens on one display surface, for example, the screens can be displayed by two-screen display for dividing the display surface into two or multi-windows for opening application software in a plurality of windows. However, there is not only a problem in that the screen size of each of the screens is reduced but also a problem in that, if a screen other than a screen that a user desires to watch is displayed next to the desired screen, the screen is annoying.

On the other hand, recently, a service for setting a large display in a public space and providing information has been widely used. However, if only one kind of information can be provided to a large number of people, efficiency of information transfer is low and diversified requests of users cannot be satisfied.

An image multiplex display system is proposed in which a plurality of kinds of information are multiplexed and displayed on one display surface and a plurality of users can respectively select and observe desired kinds of information. This system can meet diversified requests of the users.

As an example of the image multiplex display system, JP62-65580A (hereinafter referred to as Patent Literature 1) describes a system that displays a plurality of kinds of information on one display surface in a time division manner. A user observes a desired kind of information wearing shutter glasses that opens and closes in synchronization with display of the desired image information. Further, Patent Literature 1 describes a system that displays first and second polarized images having different polarized light components on the same screen in a time division manner. In this system, a user wearing polarization glasses that transmit only first polarized light can observe the first polarized image and a user wearing polarization glasses that transmit only second polarized light can observe the second polarized image.

JP62-91926 (hereinafter referred to as Patent Literature 2) describes a double broadcast system including a projection type display apparatus. When the projection type display apparatus is used, it is possible to combine two polarized images on a screen using two projecting apparatuses besides switching a polarization direction using one display apparatus in a time division manner. In this case, as in the case explained above, a user observes information wearing polarization glasses.

As a technique related to polarization glasses, which is not an image multiplex display system, JP05-323267 (hereinafter referred to as Patent Literature 3) discloses polarization glasses including polarization direction variable means. In the polarization glasses of Patent Literatures 1 and 2, a user has to wear different glasses according to a selected polarization direction. However, when this technique is used, the user can select a polarized image with one pair of glasses.

SUMMARY OF INVENTION

When the number of kinds of information is increased by using the time division technique of Patent Literature 1, an inconvenience occurs if only the number is simply increased while one information display period is maintained, i.e., a cycle period is extended, in other words, a frame frequency of one kind of information display is reduced. According to a relation of flicker felt by human eyes, a person feels flicker unless the frame frequency is set to be equal to or higher than about 50 Hz. In other words, to increase the number of kinds of information, respective information display periods have to be reduced. However, to reduce a display update period of a display, since there is a technical limit in terms of high-speed display, the number of time divisions is limited.

On the other hand, when the techniques of polarization of Patent Literature 1 and Patent Literature 2 are used and the technique of polarization of Patent Literature 3 is further used, only polarized light components orthogonal to each other can be used. In other words, only two kinds of information can be multiplexed.

Further, in the future, in addition to a request for displaying many kinds of information, from the viewpoint of protecting contents and the viewpoint of adding values to information, there will be a new request for a display system that makes it difficult to photograph display information with a video camera and the like. Naturally, the related arts explained above cannot meet such a request.

It is an object of the present invention to solve the problems and provide an image display system, an image control apparatus, an image control method, and an optical shutter that can multiplex-display a larger number of images and enable a specific person to select and observe a desired image.

In order to attain the object, an image display system according to the present invention includes: display means for spatially combining a first polarized image generated by first polarized light and a second polarized image generated by second polarized light having a polarized light component different from that of the first polarized light and displaying a combined polarized image; display control means for causing the display means to multiplex-display a plurality of different images in a time division manner concerning each of the first and second polarized images; and an optical shutter that selectively transmits only a polarized image corresponding to a selected image arbitrarily selected from among the plurality of different images.

An image control apparatus according to the present invention is an image control apparatus that controls display means for spatially combining a first polarized image generated by first polarized light and a second polarized image generated by second polarized light having a polarized light component different from that of the first polarized light and displaying a combined polarized image, the image control apparatus including: a display control unit that causes the display means to multiplex-display a plurality of different images in a time division manner concerning each of the first and second polarized images; and a control signal generating unit that outputs a control signal indicating timing of switching of the plurality of different images.

An image control method according to the present invention includes: causing display means for spatially combining a first polarized image generated by first polarized light and a second polarized image generated by second polarized light having a polarized light component different from that of the first polarized light and displaying a combined polarized image to multiplex-display a plurality of different images in a time division manner concerning each of the first and second polarized images; and causing an optical shutter to selectively transmit only a polarized image corresponding to a selected image arbitrarily selected out of the plurality of different images.

A first optical shutter according to the present invention includes: a liquid crystal panel unit in which switching of a state is performed between a first polarized light separation state in which first polarized light is transmitted and second polarized light having a polarized light component different from that of the first polarized light is blocked and a second polarized light separation state in which the second polarized light is transmitted and the first polarized light is blocked; and a liquid crystal driving unit that controls, on the basis of a control signal supplied from the outside, the switching of the first and second polarized light separation states in the liquid crystal panel unit.

A second optical shutter according to the present invention includes: a liquid crystal panel unit in which switching of a state is performed among a first polarized light separation state in which first polarized light is transmitted and second polarized light having a polarized light component different from that of the first polarized light is blocked, a second polarized light separation state in which the second polarized light is transmitted and the first polarized light is blocked, and a third polarized light separation state in which both the first polarized light and the second polarized light are blocked; and a liquid crystal driving unit that controls, on the basis of a control signal supplied from the outside, the switching of the first to third polarized light separation states in the liquid crystal panel unit.

REFERENCE SIGNS LIST 1 display control means
11 image converting unit
13 display means
14 optical shutter

DESCRIPTION OF EMBODIMENTS

An exemplary embodiment is explained below with reference to the drawings.

Figure 1:
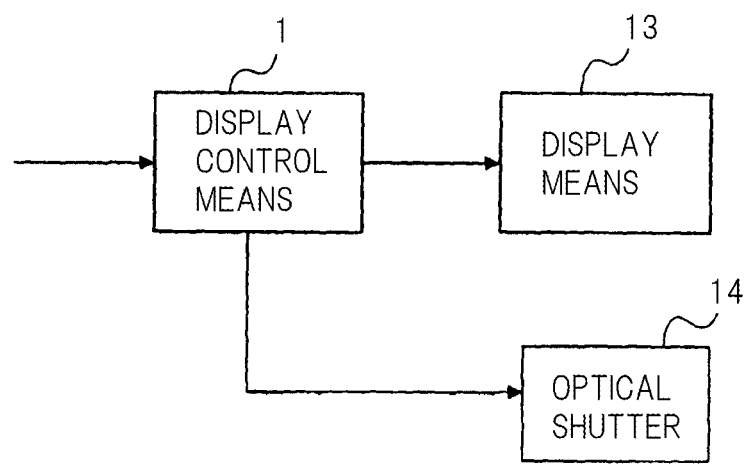
FIG. 1 is a block diagram showing the configuration of an image display system according to an exemplary embodiment.

FIG. 1 is a block diagram showing the configuration of an image display system according to the exemplary embodiment.

Referring to FIG. 1, the image display system according to this exemplary embodiment includes display means 13, display control means 1 for controlling an image display operation in display means 13, and optical shutter 14 for observing an image (a still image or a moving image) displayed by display means 13.

Display means 13 spatially combines a first polarized image generated by first polarized light and a second polarized image generated by second polarized light having a polarized light component different from that of the first polarized light and displays a combined polarized image. The first polarized light and the second polarized light correspond to, for example, P-polarized light and S-polarized light.

Image signals of a plurality of different images are supplied to display control means 1. Display control means 1 determines on which of the first polarized image and the second polarized image these plurality of different images are displayed and further determines order in multiplexing the allocated plurality of images in a time division manner. Display control means 1 generates, on the basis of a result of the determination, a first polarized image signal and a second polarized image signal from the plurality of different image signals. These first and second image signals are output from display control means 1 to display means 13. In other words, display means 13 spatially multiplexes the first polarized image and the second polarized image on which the plurality of different images are respectively time-division multiplexed and displays a multiplexed polarized image.

Further, display control means 1 generates a control signal indicating which of the polarized images the time-division multiplexed plurality of different images are and indicating at which timing the time-division multiplexed plurality of different images are switched and outputs the control signal to optical shutter 14.

The plurality of different image signals are supplied, for example, from a video processing apparatus on the outside or a video processing circuit provided in the system to display control means 1. At this point, the plurality of different image signals may be supplied through a plurality of transmission lines for each of the image signals or may be compressed or multiplexed to thereby be supplied through a small number of transmission lines.

Optical shutter 14 is an optical shutter that selects only specific image light from among a temporally or spatially multiplexed plurality of different images displayed on display means 13 and transmits the specific image light to enable an observer to enjoy a desired image. As optical shutter 14, for example, an optical shutter of an eyeglass type in which a lens portion of eyeglasses is an optical shutter is used. However, the shape of optical shutter 14 is not specifically limited.

In FIG. 1, only one optical shutter 14 is shown. However, a plurality of optical shutters 14 may be provided according to the number of observers.

A multiplex display operation in the image display system according to this exemplary embodiment is explained.

Figure 2:
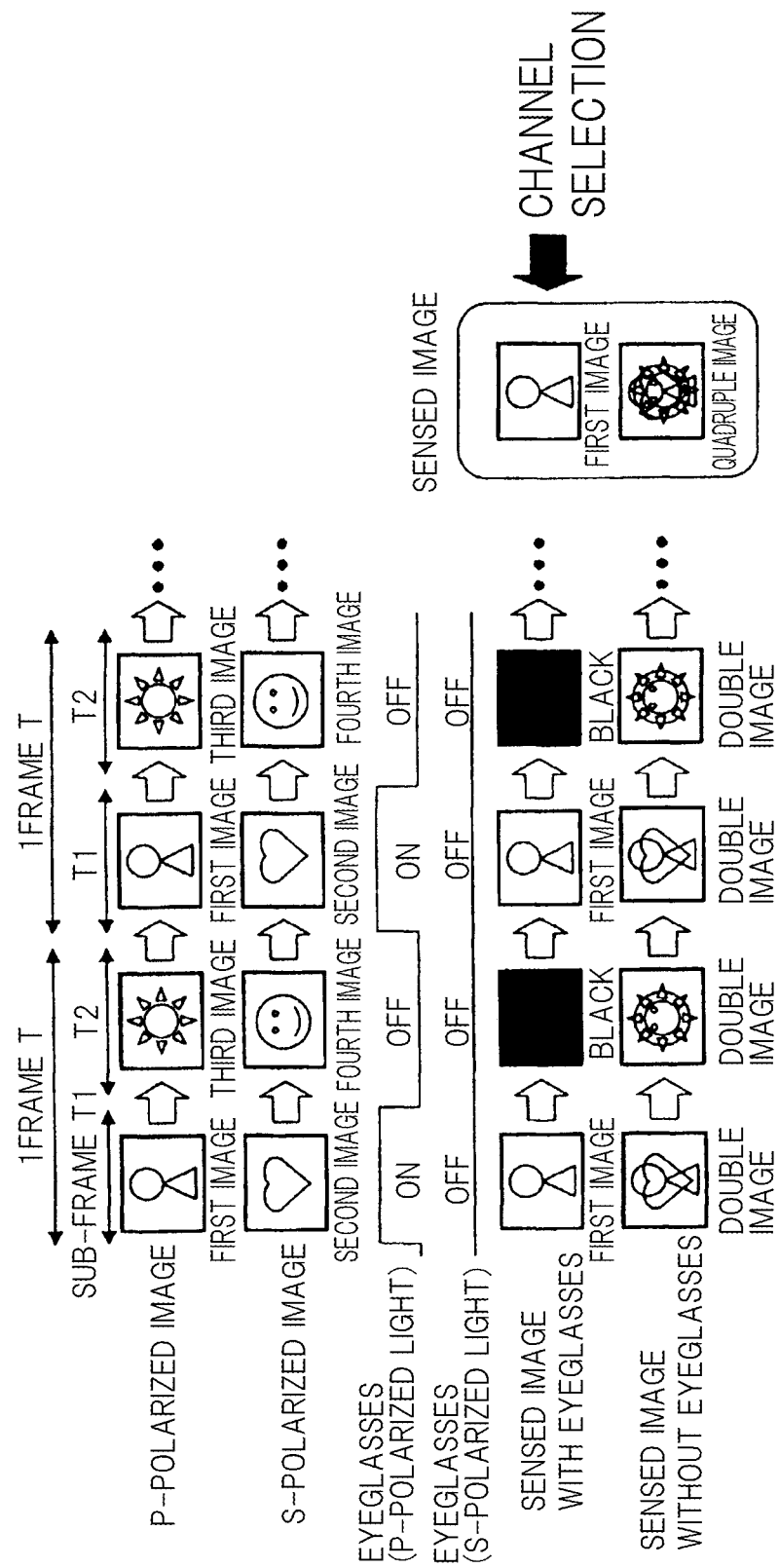
FIG. 2 is a diagram for explaining an operation principle of the image display system shown in FIG. 1.

FIG. 2 is a timing chart for explaining an operation principle of the image display system shown in FIG. 1. An example shown in FIG. 2 is an example of an operation for multiplex-displaying four different images, a first image, a second image, a third image, and a fourth image. In the following explanation, an operation performed when an observer wearing the eyeglass type optical shutter as optical shutter 14 observes a first image is explained below.

Display control means 1 determines on which of a P-polarized image as the first polarized image and an S-polarized image as the second polarized image the four different images are displayed, further determines the order in multiplexing the four different images in a time division manner and causes display means 13 to multiplex-display the four different images at the timing shown in FIG. 2.

Display control means 1 time-division multiplexes one frame as two sub-frames and causes display means 13 to display, in the order shown in FIG. 2, the first image and the third image as P-polarized images and, on the other hand, to display the second image and the fourth image as S-polarized images.

In the first sub-frame, display means 13 displays the first image by the P-polarized light and displays the second image by the S-polarized light. This is represented as first display state. At this point, optical shutter 14 transmits a P-polarized light component in a state in which the eyeglasses (the P-polarized light) are ON and blocks an S-polarized light component in a state in which the eyeglasses (the S-polarized light) is OFF. Therefore, the observer wearing the eyeglasses of optical shutter 14 senses the first image as shown in a sensed image with eyeglasses. On the other hand, an observer not wearing the eyeglasses of optical shutter 14 senses a double image obtained by combining the first image and the second image as shown in a sensed image without eyeglasses.

In the next sub-frame, display means 13 displays the third image by the P-polarized light and displays the fourth image by the S-polarized light. This is represented as second display state. At this point, optical shutter 14 blocks the P-polarized light component in the state in which the eyeglasses (the P-polarized light) is OFF and blocks the S-polarized light component in the state in which the eyeglasses (the S-polarized light) is also OFF. Therefore, the observer wearing the eyeglasses of optical shutter 14 can sense nothing as shown in the sensed image with eyeglasses. On the other hand, the observer not wearing the eyeglasses of optical shutter 14 senses a double image obtained by combining the third image and the fourth image as shown in the sensed image without eyeglasses.

When these states are set as one frame and are repeated at, for example, 60 Hz, as shown at the lower right in FIG. 2, the observer not wearing the eyeglasses of optical shutter 14 senses a quadruple image obtained by superimposing the four images from the first image to the fourth image. On the other hand, the observer wearing the eyeglasses of optical shutter 14 can sense only the first image. In other words, the observer can select a channel of the first image.

In optical shutter 14, when only the S-polarized light of the first sub-frame is turned ON, the second image is transmitted through optical shutter 14. When only the P-polarized light of the second sub-frame is turned ON, the third image is transmitted through optical shutter 14. When only the S-polarized light of the second sub-frame is turned ON, the fourth image is transmitted through optical shutter 14. In this case, the observer can select and observe a desired image.

In other words, the four images are multiplexed and displayed on one display surface. A plurality of users can respectively select and observe desired kinds of information.

Display period T as a first frame period is a period switched at a critical fusion frequency specified by average luminance and a contrast ratio of the first image to the fourth image and the first image and the third image or the second image and the fourth image, or a first display state and a second display state. The critical fusion frequency is explained below.

In general, when a bright image and a dark image are alternately displayed, an image obtained by fusing the images is sensed by human eyes at a frequency equal to or lower than a certain frequency ("Optical Engineering Handbook", pp 149 to 150, Asakura Shoten). This frequency is referred to as critical fusion frequency. In a display standard for television, a display frequency is specified on the basis of this critical fusion frequency. For example, a display period of NTSC is 60 Hz and a display period of PAL is 50 Hz.

Conversely, when brightness and darkness of images are repeated at a frequency equal to or lower than the critical fusion frequency, the observe senses flicker and is displeased. This causes an eye strain.

The critical fusion frequency depends on a contrast ratio and average luminance of alternately-displayed two images. When a luminance value of a bright image and a luminance value of a dark image of the alternately-displayed two images are respectively represented as I1 and I2, a contrast ratio C and average luminance $I_{AV}$ of these images are respectively given by the following expressions.

$$C=(I1-I2)\div(I1+I2)$$

$$I_{AV}=(I1+I2)\div 2 \qquad [\text{Expression 1}]$$

Figure 3:
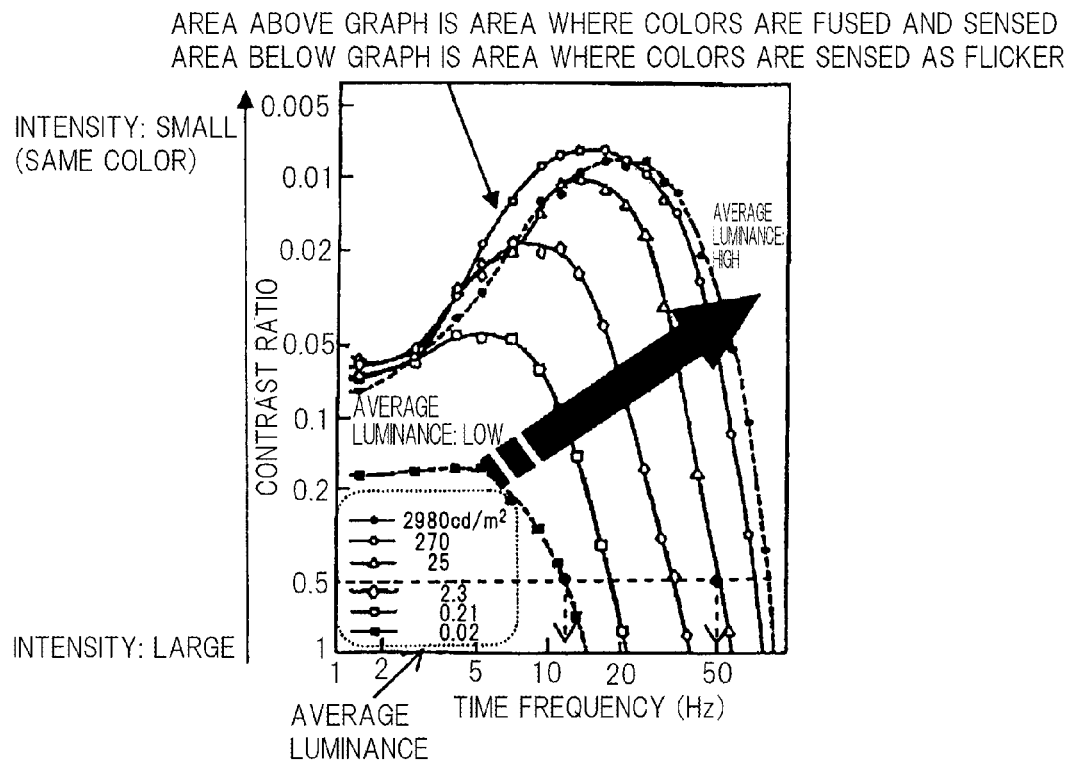
FIG. 3 is a characteristic chart showing the relation between a critical fusion frequency and a contrast ratio and average luminance in the case in which a bright image and a dark image are alternately displayed.

FIG. 3 is a characteristic chart showing the relationship between the critical fusion frequency and the contrast ratio and average luminance in the case in which the bright image and the dark image are alternately displayed. The ordinate indicates the contrast ratio and the abscissa indicates a time frequency (Hz).

As shown in FIG. 3, the critical fusion frequency is different depending on the contrast ratio of the two images and the average luminance in the entire images. For example, when the contrast ratio C is 0.5 (when a luminance ratio of the bright image and the dark image is 3:1) and the average luminance $I_{AV}$ is low ($I_{AV}$=0.21 cd/m$^2$), the two images fuse at a frequency of about 12 Hz. On the other hand, when the average luminance $I_{AV}$ is high ($I_{AV}$=270 cd/m$^2$), for the two images to fuse, it is necessary to raise the frequency to about 50 Hz.

In the image display system according to this exemplary embodiment, the situation is different for the observer wearing the eyeglasses of optical shutter 14 and for the observer not wearing the eyeglasses. In the example shown in FIG. 2, in the case of the observer wearing the eyeglasses, since an image of one of the sub-frames is a black screen, a condition with a high contrast ratio is applied. On the other hand, in the case of the observer not wearing the eyeglasses, since the four images are superimposed, a condition with high average luminance is applied. In particular, when the difference in brightness and darkness between the first display state and the second display state is large, a condition with high contrast is also applied.

With the above points taken into account, in the image display system according to this exemplary embodiment, display period T is set to a period equal to or higher than the critical fusion frequency determined from the contrast ratio of the four images and the average luminance in the entire images. The image display system according to this exemplary embodiment preferably includes a storage unit (not shown) having stored therein characteristic data concerning the characteristic chart shown in FIG. 3. Display control means 1 calculates, referring to the characteristic data, a critical fusion frequency in an area where the contrast ratio is closest to one (an area in which the difference in brightness and darkness is the largest) between the first image and the third image (or the second image and the fourth image) and between the first display state and the second display state. Display control means 1 generates a multiplexed image in which switching of the first and second display states in display means 13 is performed within display period T equal to or higher than the calculated critical fusion frequency.

The first image and the third image (or the second image and the fourth image) displayed by display means 13 is always fused temporally. Further, when the images are viewed not through optical shutter 14, a quadruple image obtained by temporally fusing a double image obtained by spatially fusing the first image and the second image in the first display state and a double image obtained by spatially fusing the third image and the fourth image in the second display state is sensed.

When the display images of display means 13 are viewed using an optical filter that transmits only the P-polarized light, a double image obtained by temporally fusing the first and third images by the P-polarized light is sensed. When the display images of display means 13 are viewed using an optical filter that transmits only the S-polarized light, a double image obtained by temporally fusing the second and fourth image by the S-polarized light is sensed.

When one sub-frame is photographed by a camera to capture only an instance of the sub-frame, a double image obtained by combining the first image and the second image or a double image obtained by combining the third image and the fourth image is photographed.

Only when viewed through optical shutter 14, the first image of the P-polarized light is sensed in the first display state and a black image is sensed in the second display state. Therefore, in display period T, only an image obtained by temporally fusing the first image of the P-polarized light and the black image, i.e., the first image is sensed without flickering.

In the one frame period shown in FIG. 2, the first display state and the second display state may be switched at any timing. In one frame period, the first display state may be executed n (n is a positive integer) times and the second display state may be executed m (m is a positive integer) times. Further, in one frame period, the switching of the first and second display states may be performed a plurality of times.

The critical fusion frequency changes according to the magnitude of the contrast ratio between the first image and the third image (or the second image and the fourth image). Specifically, when the contrast ratio is large, the critical fusion frequency is high. Conversely, when the contrast ratio is small, the critical fusion frequency is low. Therefore, display control means 1 may change display period T according to the magnitude of the contrast ratio between the first image and the third image (or the second image and the fourth image) or according to brightness of both the images.

A specific configuration of display means 13 is explained.

(First Configuration Example of Display Means 13)

Figure 4:
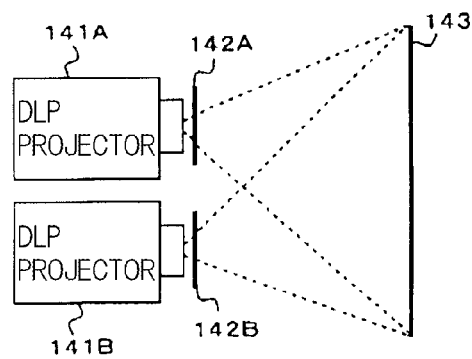
FIG. 4 is a block diagram showing a first configuration example of display means included in the image display system shown in FIG. 1.

FIG. 4 is a block diagram showing a first configuration example of display means 13 included in the image display system shown in FIG. 1.

Referring to FIG. 4, display means 13 is an exemplary embodiment of display means that can spatially combine a first polarized image and a second polarized image and display a combined polarized image. Display means 13 includes two DLP (Digital light processing) projectors 141A and 141B. DLP is a registered trademark of Texas Instruments Incorporated.

Sheet polarizer 142A that transmits only a P-polarized light component of incident light is provided on an emitting section of DLP projector 141A. Sheet polarizer 142B that transmits only an S-polarized light component of incident light is provided in an emitting section of DLP projector 141B.

The case in which the four different images, the first image, the second image, the third image, and the fourth image shown in FIG. 2 are multiplex-displayed is explained as an example.

DLP projector 141A receives an image signal concerning the P-polarized image shown in FIG. 2 from display control means 1 shown in FIG. 1 and projects an image obtained by temporally multiplexing the first image and the third image on screen 143. This projected image is an image of the P-polarized light component.

On the other hand, DLP projector 141B receives an image concerning the S-polarized image shown in FIG. 2 from display control means 1 shown in FIG. 1 and projects an image obtained by temporally multiplexing the second image and the fourth image on screen 143. This projected image is an image of the S-polarized light component.

Since the images are simultaneously projected on screen 143 from DLP projectors 141A and 141B, the image of the P-polarized light component and the image of the S-polarized light component are spatially combined and displayed on screen 143.

In this way, the first display state in which the first image by the P-polarized light is displayed and the second image by the S-polarized light is displayed and the second display state in which the third image by the P-polarized light is displayed and the fourth image by the S-polarized light is displayed are repeatedly displayed on screen 143.

(Second Configuration Example of Display Means 13)

Figure 5:
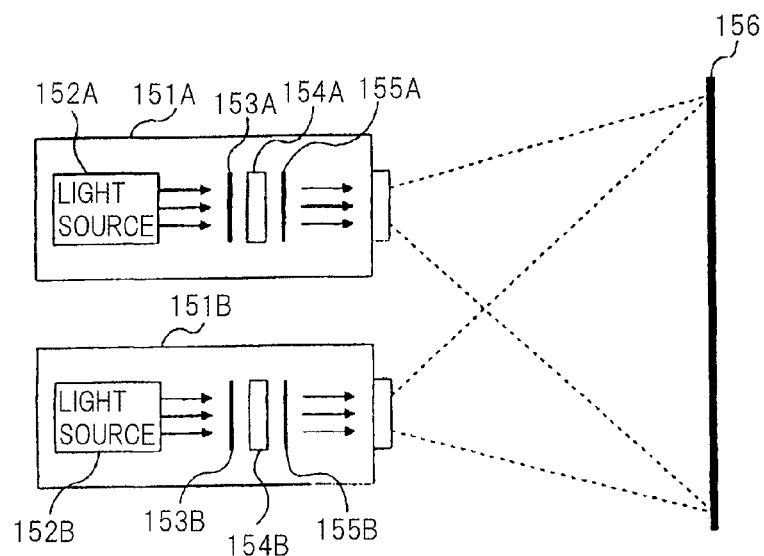
FIG. 5 is a block diagram showing a second configuration example of the display means included in the image display system shown in FIG. 1.

FIG. 5 is a block diagram showing a second configuration example of display means 13 included in the image display system shown in FIG. 1.

Referring to FIG. 5, display means 13 is an exemplary embodiment of display means that can spatially combine a first polarized image and a second polarized image and display a combined polarized image. Display means 13 includes two liquid crystal projectors 151A and 151B.

Liquid crystal projector 151A includes light source 152A and S-sheet polarizer 153A, liquid crystal panel 154A, and P-sheet polarizer 155A provided in a light traveling direction from light source 152A.

On the other hand, liquid crystal projector 151B includes light source 152B and P-sheet polarizer 153B, liquid crystal panel 154B, and S-sheet polarizer 155B provided in a light traveling direction from light source 152B.

The case in which the four different images, the first image, the second image, the third image, and the fourth image shown in FIG. 2 are multiplex-displayed is explained as an example.

Liquid crystal projector 151A receives an image signal concerning the P-polarized image shown in FIG. 2 from display control means 1 shown in FIG. 1 and projects the image obtained by temporally multiplexing the first image and the third image on screen 156. This projected image is an image of the P-polarized light component.

On the other hand, liquid crystal projector 151B receives an image signal concerning the S-polarized image shown in FIG. 2 from display control means 1 shown in FIG. 1 and projects the image obtained by temporally multiplexing the second image and the fourth image on screen 156. This projected image is an image of the S-polarized light component.

Since the images are simultaneously projected on screen 156 from liquid crystal projectors 151A and 151B, the image of the P-polarized light component and the image of the S-polarized light component are spatially combined and displayed on screen 156.

In this way, the first display state in which the first image by the P-polarized light is displayed and the second image by the S-polarized light is displayed and the second display state in which the third image by the P-polarized light is displayed and the fourth image by the S-polarized light is displayed are repeatedly displayed on screen 156.

(Third Configuration Example of Display Means 13)

Figure 6:
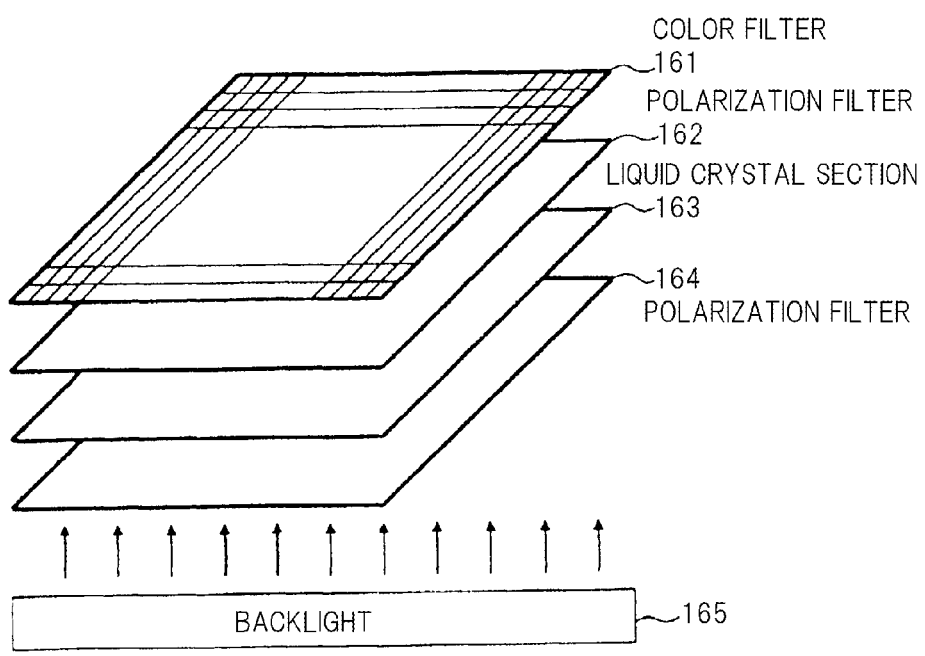
FIG. 6 is a block diagram showing a third configuration example of the display means included in the image display system shown in FIG. 1.

FIG. 6 is a block diagram showing a third configuration example of display means included in the image display system shown in FIG. 1.

Referring to FIG. 6, display means 13 is an exemplary embodiment of display means that can spatially combine a first polarized image and a second polarized image and display a combined polarized image. Display means 13 includes one liquid crystal image display device.

The liquid crystal image display device includes: a liquid crystal panel unit formed by sequentially laminating color filter 161, polarization filter 162, liquid crystal section 163 formed by holding a transparent electrode member between liquid crystals, and polarization filter 164; and backlight 165 for illuminating this liquid crystal panel unit. Color filter 161 may be provided between polarization filter 162 and liquid crystal section 163 or between polarization filter 164 and the liquid crystal section.

Figure 7A:
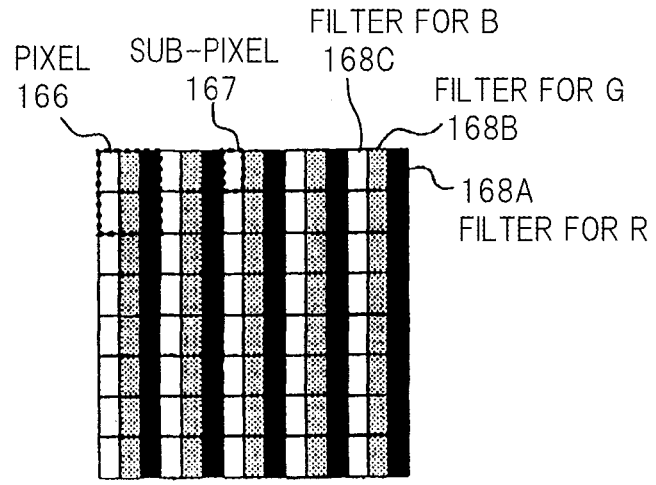
FIG. 7A is a plan view of color filters of a liquid crystal panel unit included in the display means shown in FIG. 6.
Figure 7B:
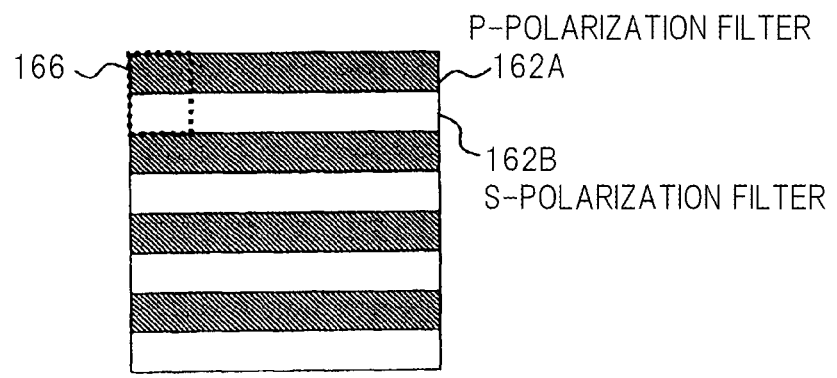
FIG. 7B is a plan view of one polarization filter of the liquid crystal panel unit included in the display means shown in FIG. 6.
Figure 7C:
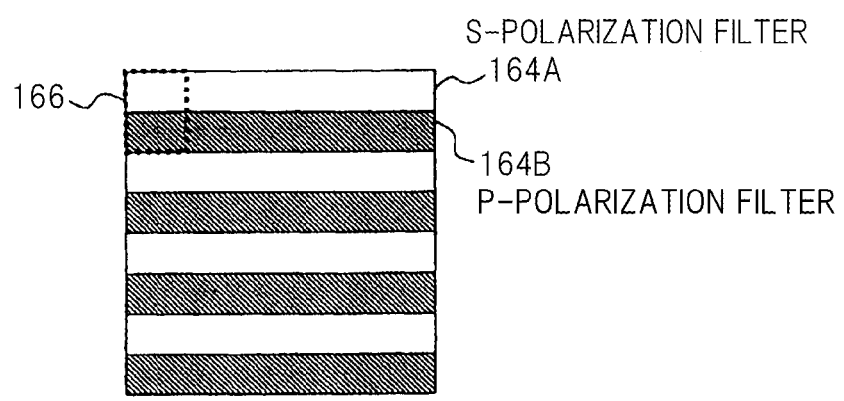
FIG. 7C is a plan view of the other polarization filter of the liquid crystal panel unit included in the display means shown in FIG. 6.

FIGS. 7A to 7C are diagrams for explaining the liquid crystal panel unit. FIG. 7A is a plan view of color filter 161, FIG. 7B is a plan view of polarization filter 162, and FIG. 7C is a plan view of polarization filter 164.

A principle of image display is the same as that of an existing liquid crystal display device. Voltages corresponding to image signals are respectively applied from a driving circuit not shown in the figure to liquid crystals of sub-pixels 167, whereby states of the liquid crystals of sub-pixels 167 are changed. Illumination light from backlight 165 is converted into liner polarized light by polarization filter 164. Transmission of light is limited by polarization filter 162 according to a state change of the liquid crystal of each of sub-pixels 167. Therefore, an image is formed according to brightness and darkness of the light.

In this configuration, the liquid crystal image display device is different from the existing liquid crystal display device in the configurations of polarization filters 162 and 164 and also is different in that the first polarized image and the second polarized image are spatially combined and displayed.

Whereas one pixel is formed by three sub-pixels for red, green, and blue in the existing liquid crystal display device, pixels 166 each including six sub-pixels 167 are two-dimensionally arrayed. In other words, the first polarized image is displayed on sub-pixels 167 in an odd number row of one pixel and the second polarized image is displayed on sub-pixels 167 in an even number row, whereby the images are spatially multiplex-displayed.

Specifically, sub-pixels 167 included in pixel 166 are arranged in two rows and three columns. As shown in FIG. 7A, among three sub-pixels 167 in the first row, filter 168C for B is formed in sub-pixel 167 on the left side, filter 168B for G is formed in sub-pixel 167 in the center, and filter 168A for R is formed in sub-pixel 167 on the right side. In three sub-pixels 167 in the second row, filter 168C for B, filter 168B for G, and filter 168A for R are formed in the same arrangement.

In polarization filter 162, as shown in FIG. 7B, linear P-polarization filters 162A and linear S-polarization filters 162B are alternately arranged for each row of sub-pixels 167. In polarization filter 162, only light of the P-polarized light component is transmitted in an area corresponding to sub-pixels 167 in the odd number row and only light of the S-polarized light component is transmitted in an area corresponding to sub-pixels 167 in the even number row.

In polarization filter 164, as shown in FIG. 7C, linear S-polarization filters 164A and linear P-polarization filter 164B are alternately arranged for each row of sub-pixels 167. In polarization filter 164, only light of the S-polarized light component is transmitted in an area corresponding to sub-pixels 167 in the odd number row and only light of the P-polarized light component is transmitted in an area corresponding to sub-pixels 167 in the even number row.

Light from backlight 165 is irradiated on the liquid crystal panel unit configured as explained above. Light from backlight 165 is made incident from polarization filter 164 side of the liquid crystal panel unit. In the liquid crystal panel unit, the P-polarized image is formed by sub-pixels 167 in the odd number row and the S-polarized image is formed by the sub-pixels in the even number row.

The liquid crystal image display device receives an image signal concerning the P-polarized image shown in FIG. 2 and an image signal concerning the S-polarized image shown in FIG. 2 from display control means 1 shown in FIG. 1. The liquid crystal image display device displays, with a not-shown driving circuit, the image obtained by temporally multiplexing the first image and the third image on the sub-pixels in the odd number row to form an image of the P-polarized light component and displays the image obtained by temporally multiplexing the second image and the fourth image on the sub-pixels in the even number row to form an image of the S-polarized light component.

In this way, the first display state in which the first image by the P-polarized light is displayed and the second image by the S-polarized light is displayed and the second display state in which the third image by the P-polarized light is displayed and the fourth image by the S-polarized light is displayed are repeatedly displayed on the liquid crystal image display device.

In polarization filters 162 and 164 shown in FIGS. 7B and 7C, the arrangement of P-polarization filters 162A and 164B and S-polarization filters 162B and 164A may be another arrangement. For example, the arrangement of P-polarization filters 162A and 164B and S-polarization filters 162B and 164A may be arrangement of a checkered shape.

Figure 8A:
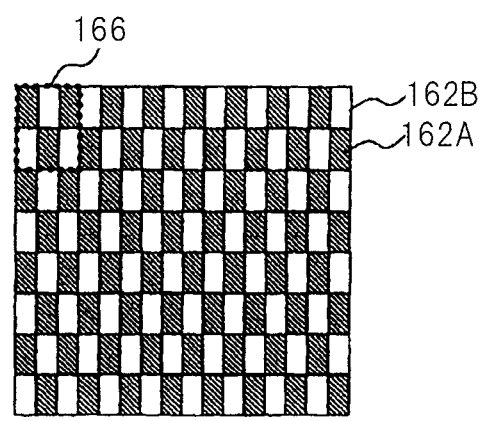
FIG. 8A is a schematic diagram showing an example of a polarization filter in which P-polarization filters and S-polarization filters are arranged in a checker pattern.
Figure 8B:
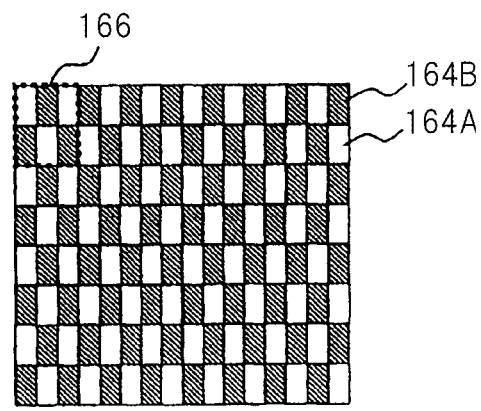
FIG. 8B is a schematic diagram showing another example of the polarization filter in which P-polarization filters and S-polarization filters are arranged in a checker pattern.

Examples of polarization filters 162 and 164 in which P-polarization filters and S-polarization filters are arranged in a checkered shape are shown in FIGS. 8A and 8B. In polarization filter 162, among the sub-pixels in two rows and three columns included in pixel 166, P-polarization filters 162A are formed in areas corresponding to the sub-pixel in the first row and the first column, the sub-pixel in the second row and the second column, and the sub-pixel in the first row and the third column and S-polarization filters 162B are formed in areas corresponding to the remaining three sub-pixels. On the other hand, in polarization filter 164, among the sub-pixels in two rows and three columns included in pixel 166, S-polarization filters 164A are formed in areas corresponding to the sub-pixel in the first row and the first column, the sub-pixel in the second row and the second column, and the sub-pixel in the first row and the third column and P-polarization filters 164B are formed in areas corresponding to the remaining three sub-pixels.

The liquid crystal display device displays, with the not-shown driving circuit, the image obtained by temporally multiplexing the first image and the third image on the sub-pixels corresponding to P-polarization filters 162A to form an image of the P-polarized light component and displays the image obtained by temporally multiplexing the second image and the fourth image on the sub-pixels corresponding to S-polarization filter 162B to form an image of the S-polarized light component.

In such arrangement of the checkered shape, as in the arrangement explained above, it is possible to repeatedly display the first display state in which the first image by the P-polarized light is displayed and the second image by the S-polarized light is displayed and the second display state in which the third image by the P-polarized light is displayed and the fourth image by the S-polarized light is displayed.

In the third configuration example of display means 13 explained above, polarization filters 162 and 164 may have a configuration in which liner polarization filters for P-polarized light and S-polarized light are arrayed in the stripe shape or in the checkered shape shown in FIGS. 7B and 7C or FIGS. 8A and 8B. For example, as S-polarization filters 162 and 164, polarization filters in which half-wave plates are arrayed and formed in a stripe shape or in a checkered shape on liner polarization filters for P-polarized light, whereby portions of the half-wave plates are caused to act as S-polarization filters may be respectively used. Further, even if linear polarization filters are used as S-polarization filter 164 and, as S-polarization filters 162, polarization filters in which half-wave plates are arranged and formed in a stripe shape or in a checkered shape on liner polarization filters are used, it is possible to spatially combine the first polarized image and the second polarized image and display a combined polarized image in the same manner.

Optical shutter 14 is explained.

As shown in FIG. 2, from among the quadruple image obtained by superimposing the four images, which include the first image to the fourth image, when optical shutter 14 transmits only the P-polarized image of the first sub-frame and blocks both the P-polarized image and the S-polarized image of the second sub-frame, the observer wearing the eyeglasses of optical shutter 14 can sense the first image and, when optical shutter 14 transmits only the S-polarized image of the first sub-frame and blocks both the P-polarized image and the S-polarized image of the second sub-frame, the observer can sense the second image. When optical shutter 14 blocks both the P-polarized image and the S-polarized image of the first sub-frame and transmits only the P-polarized image of the second sub-frame, the observer wearing the eyeglasses of optical shutter 14 can sense the third image and, when optical shutter 14 transmits only the S-polarized image of the second sub-frame, the observer can sense the fourth image.

In other words, optical shutter 14 switches three polarized light separation states, a first polarized light separation state in which optical shutter 14 transmits the P-polarized image and blocks the S-polarized image, a second polarized light separation state in which optical shutter 14 blocks the P-polarized image and transmits the S-polarized image, and a third polarized light separation state in which optical shutter 14 blocks both the P-polarized image and the S-polarized image.

(First Configuration Example of Optical Shutter 14)

Figure 10A:
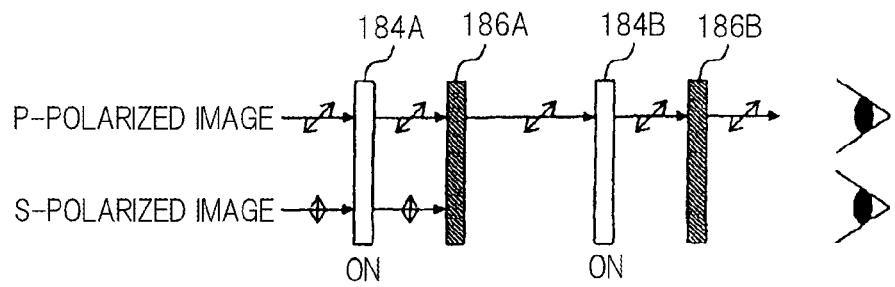
FIG. 10A is a schematic diagram showing a first polarized light separation state of the optical shutter shown in FIG. 9.
Figure 10B:
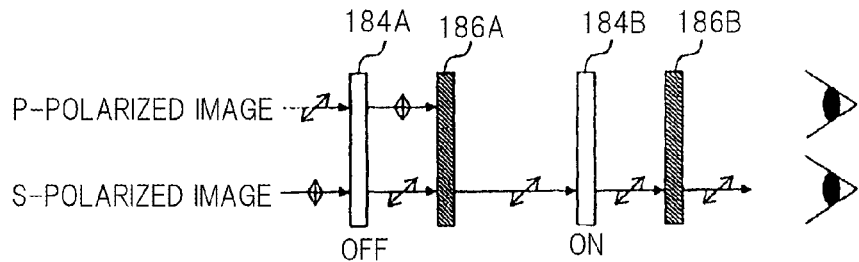
FIG. 10B is a schematic diagram showing a second polarized light separation state of the optical shutter shown in FIG. 9.
Figure 10C:
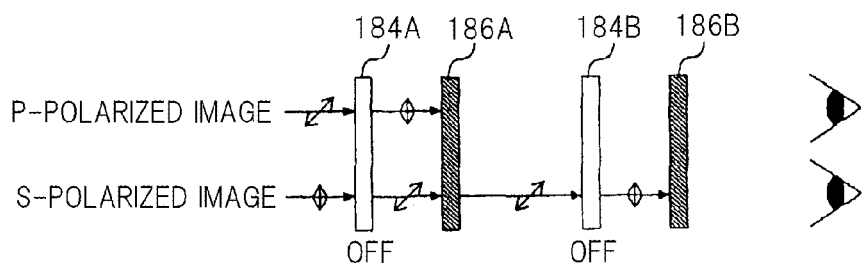
FIG. 10C is a schematic diagram showing a third polarized light separation state of the optical shutter shown in FIG. 9.

FIGS. 10A to 10C are diagrams for explaining the operation of a first configuration example of optical shutter 14.

Optical shutter 14 is configured such that liquid crystal 184A, P-sheet polarizer 186A, liquid crystal 184B, and P-sheet polarizer 186B are arranged in order and image light is made incident from liquid crystal 184A side. For simplification, a transparent electrode and a driving circuit for applying voltage to the liquid crystals, a control circuit, and the like are omitted. FIG. 10A is a schematic diagram showing a first polarized light separation state, FIG. 10B is a schematic diagram showing a second polarized light separation state, and FIG. 10C is a schematic diagram showing a third polarized light separation state.

When liquid crystal 184A is ON, incident light is transmitted through liquid crystal 184A while maintaining a polarization state thereof. When liquid crystal 184A is OFF, the incident light is transmitted through liquid crystal 184A with a polarization direction thereof rotated 90 degrees. The same holds true concerning liquid crystal 184B.

FIG. 10A shows a case in which both liquid crystals 184A and 184B are set in an ON state. Since the P-polarized image is transmitted through liquid crystal 184A while maintaining a polarization state thereof, the P-polarized image is transmitted through P-sheet polarizer 186A. On the other hand, although the S-polarized image is also transmitted through liquid crystal 184A while maintaining a polarization state thereof, since the polarization direction of the S-polarized image is orthogonal to P-sheet polarizer 186A, the S-polarized image cannot be transmitted through P-sheet polarizer 186A and is blocked. The polarization state of the P-polarized image transmitted through P-sheet polarizer 186A is also maintained in liquid crystal 184B. The P-polarized image is transmitted through P-sheet polarizer 186B. Therefore, optical shutter 14 switches to the first polarized light separation state in which optical shutter 14 transmits the P-polarized image and blocks the S-polarized image.

FIG. 10B shows a case in which liquid crystal 184A is set in an OFF state and liquid crystal 184B is set in the ON state. The P-polarized image is changed to S-polarized light with the polarization direction thereof rotated 90 degrees and is transmitted through liquid crystal 184A. Therefore, the P-polarized image cannot be transmitted through P-sheet polarizer 186A and is blocked. On the other hand, the S-polarized image is changed to P-polarized light with the polarization direction thereof rotated 90 degrees and is transmitted through liquid crystal 184A. Therefore, the S-polarized image is transmitted through P-sheet polarizer 186A. The polarization state of the S-polarized image transmitted through P-sheet polarizer 186A is also maintained in liquid crystal 184B. The S-polarized image is transmitted through P-sheet polarizer 186B. Therefore, optical shutter 14 switches to the second polarized light separation state in which optical shutter 14 blocks the P-polarized image and transmits the S-polarized image.

FIG. 10C shows a state in which both liquid crystals 184A and 184B are set in the OFF state. The P-polarized image is changed to S-polarized light with the polarization direction thereof rotated 90 degrees and is transmitted through liquid crystal 184A. Therefore, the P-polarized image cannot be transmitted through P-sheet polarizer 186A and is blocked. On the other hand, the S-polarized image is changed to P-polarized light with the polarization direction thereof rotated 90 degrees and is transmitted through liquid crystal 184A. Therefore, the S-polarized image is transmitted through P-sheet polarizer 186A. The S-polarized image transmitted through P-sheet polarizer 186A is changed to S-polarized light again with the polarization direction thereof rotated 90 degrees and is transmitted through liquid crystal 184B. Therefore, the S-polarized image cannot be transmitted through e P-sheet polarizer 186B and is blocked. Therefore, optical shutter 14 switches to the third polarized light separation state in which optical shutter 14 blocks both the P-polarized image and the S-polarized image.

Although not shown in the figures, when liquid crystal 184A is set in the ON state and liquid crystal 184B is set in the OFF state, the P-polarized image is transmitted through liquid crystal 184A while maintaining the polarization state thereof. Therefore, the P-polarized image is transmitted through the P-sheet polarizer. On the other hand, although the S-polarized image is also transmitted through liquid crystal 184A while maintaining the polarization state thereof, since the polarization direction of the S-polarized light is orthogonal to P-sheet polarizer 186A, the S-polarized image cannot be transmitted through P-sheet polarizer 186A and is blocked. The P-polarized image transmitted through P-sheet polarizer 186A is changed to S-polarized light with the polarization direction thereof rotated 90 degrees and is transmitted through liquid crystal 184B. Therefore, the P-polarized image cannot be transmitted through P-sheet polarizer 186B and is blocked. Therefore, optical shutter 14 switches to the third polarized light separation state in which optical shutter 14 blocks both the P-polarized image and the S-polarized image as in the state shown in FIG. 10C. In other words, if liquid crystal 184B is off irrespective of the ON or OFF state of liquid crystal 184A, optical shutter 14 switches to the third polarized light separation state in which optical shutter 14 blocks both the P-polarized image and the S-polarized image.

Switching timing for the first to third polarized light separation states in optical shutter 14 shown in FIGS. 10A to 10C is synchronized with the display timing of the first to fourth images shown in FIG. 2. Therefore, when a display image of display means 13 is viewed through optical shutter 14, only a selected image is sensed. If optical shutter 14 is not used, an image obtained by spatially and temporally fusing the first to fourth images is sensed.

In optical shutters 14 shown in FIGS. 10A to 10C, even if S-sheet polarizers are used instead of P-sheet polarizers 186A and 186B, operations same as those explained above can be realized. In this case, when both liquid crystals 184A and 184B are set in the ON state, the optical shutter switches to the second polarized light separation state. When liquid crystal 184A is set in the OFF state and liquid crystal 184B is set in the ON state, the optical shutter switches to the first polarized light separation state. When both liquid crystals 184A and 184B are set in the OFF state, the optical shutter switches to the third polarized light separation state. Besides, even in a combination of the P-sheet polarizer and the S-sheet polarizer and a combination of the S-sheet polarizer and the P-sheet polarizer, the same operations can be realized by controlling the states of liquid crystals 184A and 184B. Further, even if an optical shutter is used in which incident light is transmitted through liquid crystals 184A and 184B with a polarization direction thereof rotated 90 degrees when liquid crystals 184A and 184B are ON and the incident light is transmitted through liquid crystals 184A and 184B while maintaining the polarization state thereof when liquid crystals 184A and 184B are OFF, it is possible to realize the same operations by appropriately selecting the P-sheet polarizer and the S-sheet polarizer. Various exemplary embodiments are possible.

Figure 9:
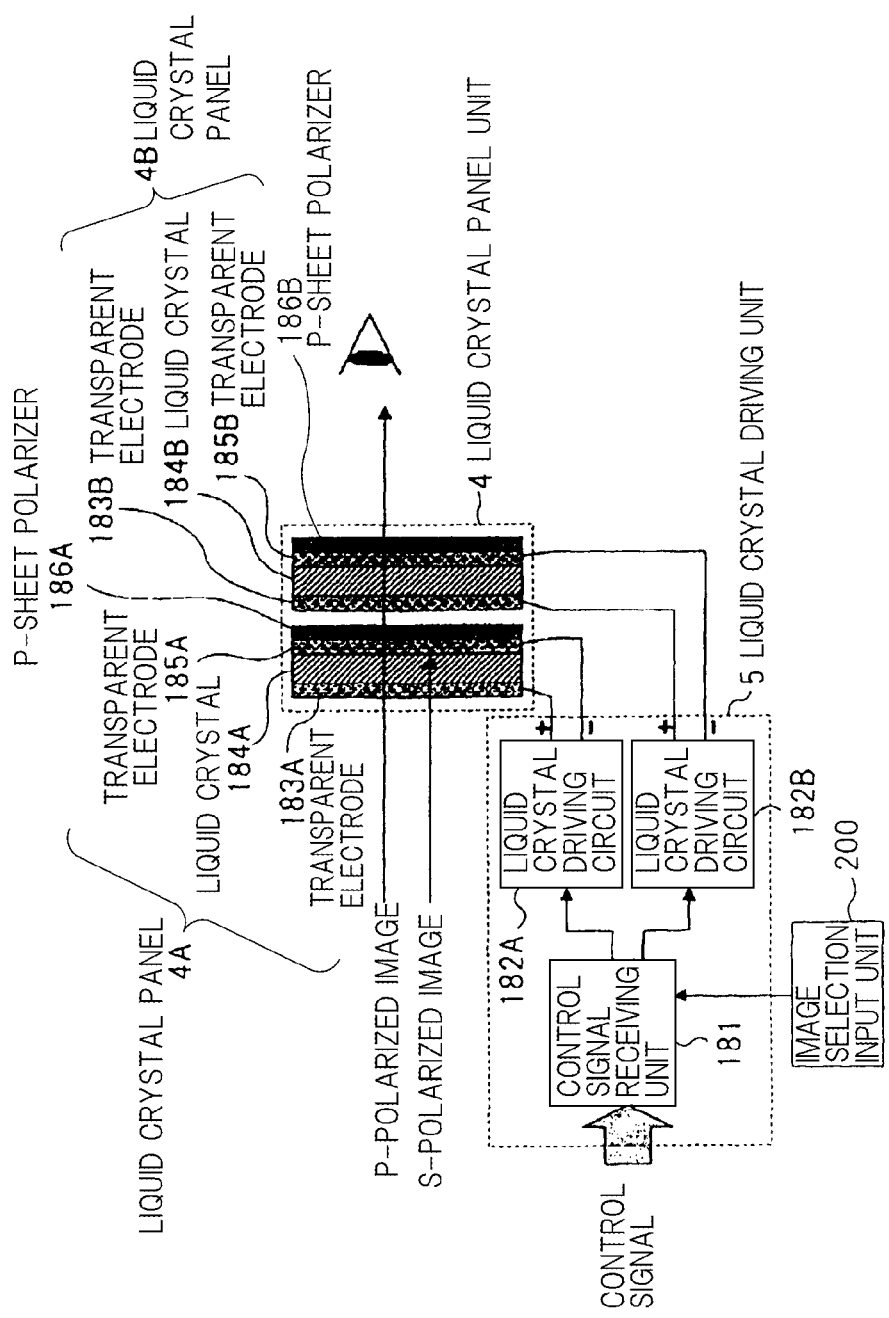
FIG. 9 is a block diagram showing a first configuration example of an optical shutter included in the image display system shown in FIG. 1.

FIG. 9 is a block diagram showing a specific configuration of the first configuration example of optical shutter 14.

Optical shutter 14 shown in FIG. 9 is an optical shutter that can switch the first to third polarized light separation states and includes liquid crystal panel unit 4, liquid crystal driving unit 5 that drives liquid crystal panel unit 4, and image selection input unit 200.

Liquid crystal driving unit 5 includes control signal receiving unit 181 and liquid crystal driving circuits 182A and 182B. Liquid crystal panel unit 4 includes liquid crystal panel 4A in which liquid crystal 184A is held between two transparent electrodes 183A and 185A, liquid crystal panel 4B in which liquid crystal 184B is held between two transparent electrodes 183B and 185B, P-sheet polarizer 186A arranged on an exit surface side of liquid crystal panel 4A, and P-sheet polarizer 186B arranged on an exit surface side of liquid crystal panel 4B. Liquid crystal panel 4A is arranged on a side on which a polarized image from display means 13 is made incident. Liquid crystal panel 4B is arranged on the exit surface side of liquid crystal panel 4A.

Control signal receiving unit 181 receives a control signal from display control means 1. The control signal from display control means 1 is a signal indicating which of the polarized images a plurality of different images on display means 13 are and indicating at which timing the images are displayed. Control signal receiving unit 181 determines, on the basis of the received control signal and an input signal indicating which image the observer wearing the eyeglasses of optical shutter 14 selects using image selection input unit 200, one polarized light separation state for each sub-frame from the three polarized light separation states shown in FIGS. 10A to 10C and generates a first driving control signal for liquid crystal panel 4A and a second driving control signal for liquid crystal panel 4B. The first driving control signal is supplied to liquid crystal driving circuit 182A and drives liquid crystal panel 4A. The second driving control signal is supplied to liquid crystal driving circuit 182B and drives liquid crystal panel 4B.

Such optical shutter 14 can select and transmit only specific image light from among a temporally and spatially multiplexed plurality of different images displayed on display means 13. An observer can enjoy a desired image.

In the configuration shown in FIG. 9, the control signal may be received via a wire or the control signal sent by an infrared ray or radio may be received.

Image selection input unit 200 and liquid crystal driving unit 5 may be provided as separate units without being incorporated in the eyeglasses. For example, image selection input unit 200 may be configured the same as a remote controller of a television set.

Further, besides the configuration in which a signal indicating which image is selected is input from image selection input unit 200 to control signal receiving unit 181, a configuration may be adopted in which the signal indicating which image is selected is input from image selection input unit 200 to display control means, a generated signal indicating which polarized image is the selected image from among a plurality of different images and indicating at which timing the image is displayed is set as a control signal, and the control signal is transmitted from display control means 1 to control signal receiving units 181 of respective eyeglasses.

(Second Configuration Example of Optical Shutter 14)

Figure 11:
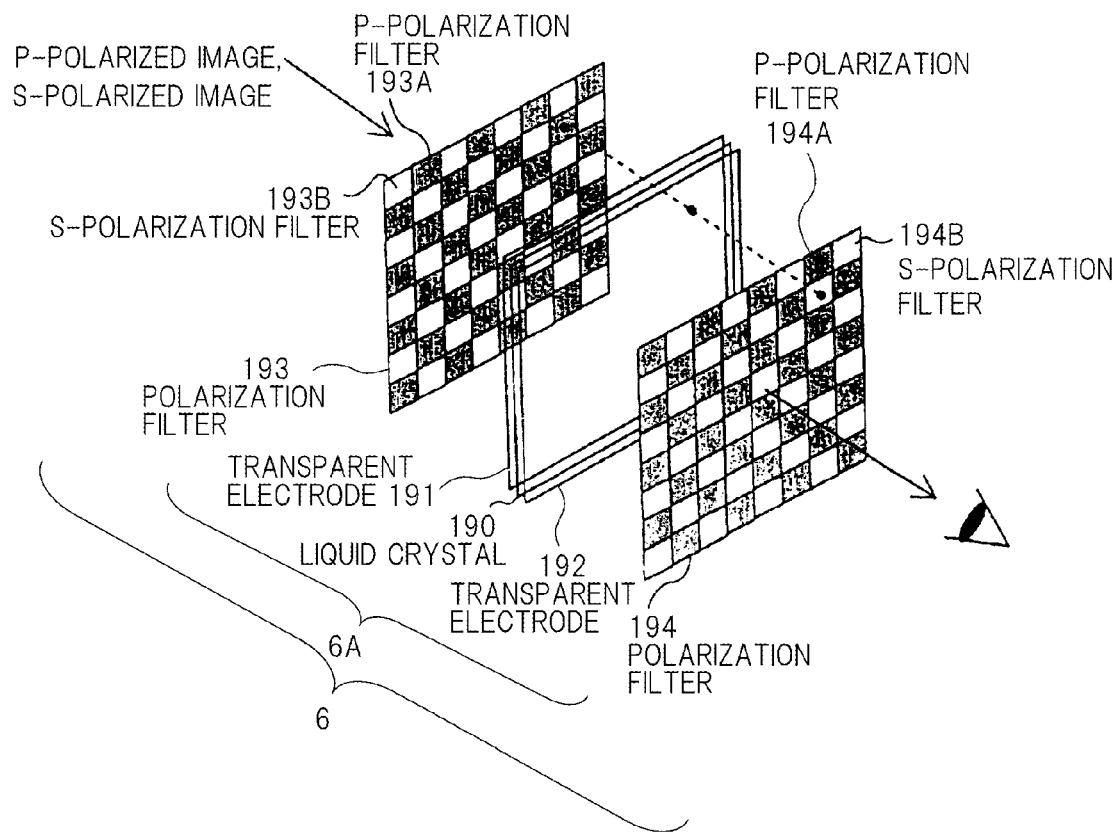
FIG. 11 is a block diagram showing a second configuration example of the optical shutter included in the image display system shown in FIG. 1.
Figure 12:
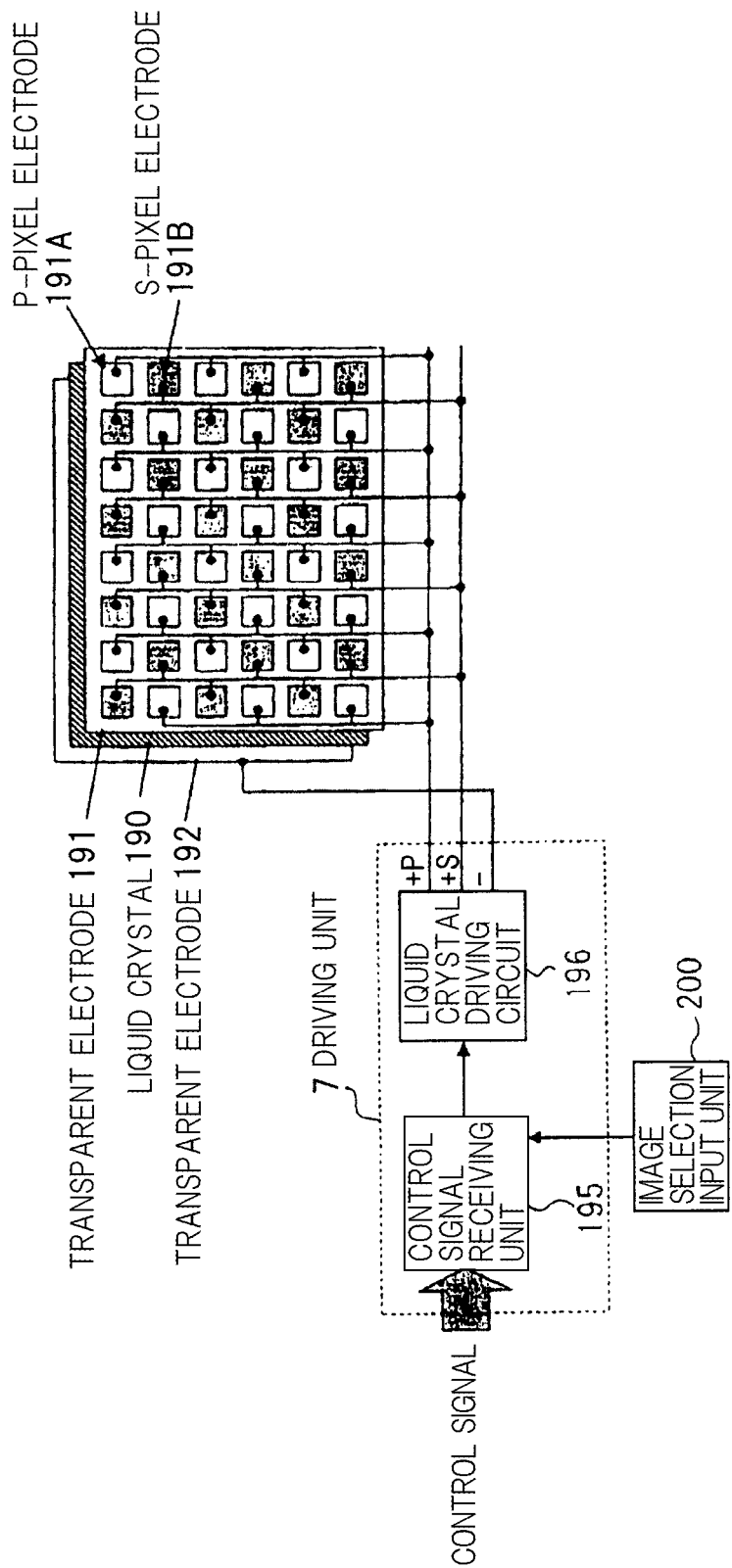
FIG. 12 is a block diagram showing a driving unit and an electrode unit of a liquid crystal panel unit of the optical shutter shown in FIG. 11.

FIGS. 11 and 12 are schematic diagrams showing a second configuration example of optical shutter 14 including liquid crystal panel unit 6, liquid crystal driving unit 7, and image selection input unit 200. FIG. 11 shows the configuration of liquid crystal panel unit 6. Liquid crystal panel unit 6 includes liquid crystal panel 6A and polarization filters 193 and 194. FIG. 12 is a diagram of an electrode unit of liquid crystal panel 6A shown in FIG. 11 and a block diagram of liquid crystal driving unit 7.

As shown in FIG. 11, liquid crystal panel unit 6 includes liquid crystal panel 6A in which liquid crystal 190 is held between two transparent electrodes 191 and 192, polarization filter 193 arranged on an incidence surface side of liquid crystal panel 6A, and polarization filter 194 arranged on an exit surface side of liquid crystal panel 6A. As shown in FIG. 12, transparent electrode 191 includes a plurality of pixel electrodes arranged in a matrix shape. These pixel electrodes include P-pixel electrodes 191A and S-pixel electrodes 191B. P-pixel electrodes 191A and S-pixel electrodes 191B are arranged in a checkered shape.

Polarization filter 193 includes P-polarization filters 193A and S-polarization filters 193B. P-polarization filters 193A are arranged in a checkered shape in areas corresponding to P-pixel electrodes 191A of liquid crystal panel 6A and S-polarization filters 193B are arranged in a checkered shape in areas corresponding to S-pixel electrodes 191B.

Polarization filter 194 includes P-polarization filters 194A and S-polarization filters 194B. However, S-polarization filter 194B are arranged in a checkered shape in areas corresponding to P-pixel electrodes 191A of liquid crystal panel 6A and P-polarization filters 194A are arranged in a checkered shape in areas corresponding to S-pixel electrodes 191B.

When the pixels of liquid crystal panel 6A are ON, voltage is not applied to the pixel electrodes and the polarization direction of light made incident on liquid crystal 190 is rotated 90 degrees. When the pixels are OFF, voltage is applied to the pixel electrodes and the light made incident on liquid crystal 190 maintains a polarization state thereof.

In this configuration, when the P-polarized image and the S-polarized image are simultaneously input to liquid crystal panel unit 6, the P-polarized image is transmitted through only the areas of P-polarization filters 193A and the S-polarized image is transmitted through only the areas of S-polarization filters 194B by polarization filter 193.

The respective images are made incident on liquid crystal 190. A state of liquid crystal 190 is changed by voltage applied to P-pixel electrodes 191A and S-pixel electrodes 191B. Therefore, it is possible to independently control whether the respective images are transmitted through polarization filter 194.

Specifically, when P-pixels are ON and S-pixels are OFF, only the P-polarized image is transmitted through liquid crystal panel unit 6. When the P-pixels are OFF and the S-pixels are ON, only the S-polarized image is transmitted through liquid crystal panel unit 6. When both the P-pixels and the S-pixels are OFF, both the P-polarized image and the S-polarized image are not transmitted through liquid crystal panel unit 6.

In other words, whereas two liquid crystal panels 4A and 4B are used in the first configuration example shown in FIG. 9 and FIGS. 10A to 10C, in this second configuration example, two kinds of pixel electrodes are included in one liquid crystal panel. This makes it possible to switch the three polarized light separation states, the first polarized light separation state in which optical shutter 14 transmits the P-polarized image and blocks the S-polarized image, the second polarized light separation state in which optical shutter 14 blocks the P-polarized image and transmits the S-polarized image, and the third polarized light separation state in which optical shutter 14 blocks both the P-polarized image and the S-polarized image.

Liquid crystal driving unit 7 includes control signal receiving unit 195 and liquid crystal driving circuit 196.

Control signal receiving unit 195 receives a control signal from display control means 1. The control signal from display control means 1 is a signal indicating which of the polarized images a plurality of different images on display means 13 are and indicating at which timing the images are displayed. Control signal receiving unit 195 determines, on the basis of the received control signal and an input signal indicating which image the observer wearing the eyeglasses of optical shutter 14 selects using image selection input unit 200, one polarized light separation state for each sub-frame from the three polarized light separation states and generates a P-pixel electrode driving control signal and an S-pixel electrode driving control signal for liquid crystal panel 6A. The P-pixel electrode driving control signal is supplied to liquid crystal driving circuit 196 and drives P-pixel electrodes 191A of liquid crystal panel 6A. The S-pixel electrode driving control signal is supplied to liquid crystal driving circuit 196 and drives the S-pixel electrodes of liquid crystal panel 6A.

Optical shutter 14 driven in this way can select and transmit only specific image light from among a temporally and spatially multiplexed plurality of different images displayed on display means 13. An observer can enjoy a desired image.

Optical shutter 14 is arranged in front of the eyes of the observer. P-pixel electrodes 191A and S-pixel electrodes 191B do not correspond to the pixels of each of the P-polarized image and the S-polarized image displayed by display means 13 in a one to one relationship. When at least the plurality of P-pixel electrodes 191A and S-pixel electrodes 191B are formed to be arranged with respect to the size of the pupils (having a diameter of several millimeters) of the eyes of the observer, the pixels of the liquid crystal panel unit 6 acts as an optical shutter for the entire images of each P-polarized image and each S-polarized image.

Polarization filters 193 and 194 may be polarization filters in which liner polarization filters for P-polarized light and S-polarized light are arrayed in the checkered shape shown in FIG. 11 or may be polarization filters in which, for example, half-wave plates are arrayed and formed in a checkered shape on liner polarization filters for P-polarized light, whereby portions of the half-wave plates are caused to act as S-polarization filters.

According to optical shutter 14 of this configuration example, only one liquid crystal panel unit has to be provided. Therefore, compared with the optical shutter of the first configuration example including two liquid panel units, since the number of liquid crystal panel units is smaller, it is possible to reduce weight and thickness of the optical shutter.

Optical shutter 14 of this configuration example can perform control for independently selecting and transmitting the P-polarized image and the S-polarized image. Therefore, unlike the sub-frames shown in FIG. 2, sub-frames of the P-polarized image and the S-polarized image do not always have to be displayed in synchronization with each other.

According to the image display system according to this exemplary embodiment explained above, the first and second polarized images are spatially multiplexed and displayed and a plurality of different images are multiplexed and displayed in a time division manner in each of the first and second polarized images. Therefore, compared with those described in Patent Literatures 1 and 2, since the plurality of different images can be multiplexed and displayed in a time division manner in each of the first and second polarized images, the number of images that can be displayed is increased and it is possible to provide a larger number of kinds of image information.

It is difficult to make an illegal copy of the configuration in which a polarized light separation state of optical shutter 14 is controlled in synchronization with display timing for a selected image of display means 13, compared with the optical shutter described in Patent Literature 1. When an observer simply wears eyeglasses having a polarization filter instead of optical shutter 14, the observer observes a double image obtained by combining the first image and the third image or the second image and the fourth image. Even if a shutter of a camera or a video camera is clicked, an image obtained by combining the first image and the second image or the third image and the fourth image will be photographed. It is impossible to distinguish, from among polarized images, which desired image is present just by wearing the eyeglasses of the liquid crystal shutter. Moreover, if the timing for an image display is unknown from the beginning, it is difficult to select one image. Further, in the second configuration example of optical shutter 14, the sub-frames of the P-polarized image and the S-polarized image do not have to be displayed in synchronization with each other. Therefore, unless optical shutter 14 is used, it is more difficult to discriminate where a desired image is present.

Therefore, with the image display system according to this exemplary embodiment, it is possible to provide a service for enabling only a person having optical shutter 14 to select and obtain desired image information from among a plurality of kinds of image information. Further, it is possible to make it difficult to photograph an image with a video camera or the like. Therefore, there is also an effect in which the image display system is also useful from the viewpoint of content protection.

In the image display system according to this exemplary embodiment explained above, the display form of a multi-channel image is not limited to that shown in FIG. 2. There are various display forms that can be used as the display of a multi-channel image. Display operations for a multi-channel image that can be carried out in the image display system according to this exemplary embodiment are explained below.

(1) Multi-Channel Display:

Multi-channel display is not limited to the display of the four different images shown in FIG. 2. Display means 13 multiplex-displays three or more channel images as P-polarized images in a time division manner in one frame period, i.e., display period T and multiplex-displays three or more channel images as S-polarized images. Six or more channel images are displayed on display means 13. An observer can select and view a desired image using optical shutter 14.

Figure 13:
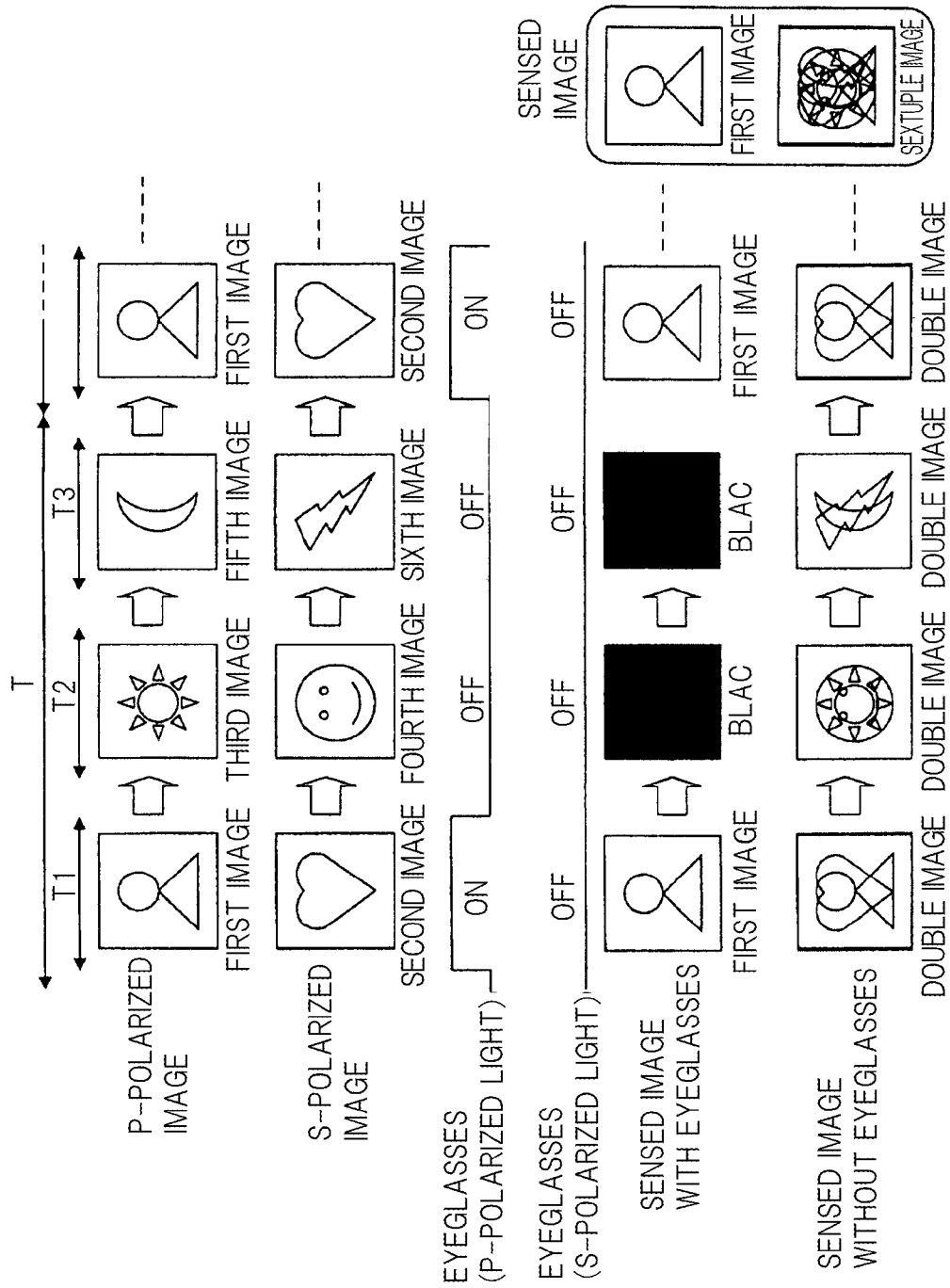
FIG. 13 is a diagram for explaining an example of a multi-channel display performed in the image display system shown in FIG. 1.

As an example of the multi-channel display, a multiple display example of a six-channel image is shown in FIG. 13. In the example shown in FIG. 13, first to third sub-frame periods T1 to T3 are provided in display period T of display means 13. First, third, and fifth images are respectively displayed as the P-polarized images and second, fourth, and sixth images are respectively displayed as the S-polarized images. In the following explanation, an operation in the case in which the first image is set as a selected channel image is explained.

In first sub-frame period T1, on display means 13, the first image is displayed by P-polarized light and the second image is displayed by S-polarized light. In first sub-frame period T1, optical shutter 14 transmits a P-polarized light component and blocks an S-polarized light component. In this case, only the first image as the P-polarized light displayed on display means 13 is transmitted through optical shutter 14. Therefore, in first sub-frame period T1, a sensed image obtained when optical shutter 14 is used is the first image (a sensed image with eyeglasses shown in FIG. 13). When optical shutter 14 is not used, the observer observes a spatially combined image of the first image of the P-polarized light and the second image of the S-polarized light displayed on display means 13 (a sensed image without eyeglasses).

In second sub-frame period T2, on display means 13, the third image is displayed by the P-polarized light and the fourth image is displayed by the S-polarized light. In second sub-frame period T2, optical shutter 14 blocks both the S-polarized light component and the P-polarized light component. Therefore, in second sub-frame period T2, a sensed image obtained when optical shutter 14 is used is a black image. When optical shutter 14 is not used, the observer observes a spatially combined image of the third image of the P-polarized light and the fourth image of the S-polarized light displayed on display means 13.

In third sub-frame period T3, on display means 13, the fifth image is displayed by the P-polarized light and the sixth image is displayed by the S-polarized light. In third sub-frame period T3, as in second sub-frame period T2, optical shutter 14 blocks both the S-polarized light component and the P-polarized light component. Therefore, in third sub-frame period T3, a sensed image obtained when optical shutter 14 is used is a black image. When optical shutter 14 is not used, the observer observes a spatially combined image of the fifth image of the P-polarized light and the sixth image of the S-polarized light displayed on display means 13.

When these states are set as one frame and are repeated at, for example, 60 Hz, as shown in a sensed image at the lower right in FIG. 13, the observer not wearing the eyeglasses of optical shutter 14 senses a sextuple image obtained by superimposing the six images from the first image to the sixth image. On the other hand, the observer wearing the eyeglasses of optical shutter 14 can sense only the first image. In other words, the observer can select a channel of the first image.

When a display image of display means 13 is viewed using an optical filter that transmits only the P-polarized light, a triple image obtained by temporally fusing the first, third, and fifth images by the P-polarized light is sensed. When a display image of display means 13 is viewed using an optical filter that transmits only the S-polarized light, a triple image obtained by temporally fusing the second, fourth, and sixth images by the S-polarized light is sensed.

When one sub-frame is photographed by a camera to capture only an instance of the sub-frame, a double image obtained by combining the first image and the second image, a double image obtained by combining the third image and the fourth image, or a double image obtained by combining the fifth and the sixth image is photographed.

In other words, only when the images are viewed through optical shutter 14, only the first image is sensed.

Therefore, with the image display system according to this exemplary embodiment, it is possible to provide a service for enabling only a person having optical shutter 14 to select and obtain desired image information from among a plurality of kinds of image information. Further, it is possible to make it difficult to photograph an image with a video camera or the like. Therefore, the image display system is also useful from the viewpoint of content protection.

(2) Two-Channel Polarized Light Switching Display:

Polarized light switching display useful in terms of content protection is explained below.

Figure 14:
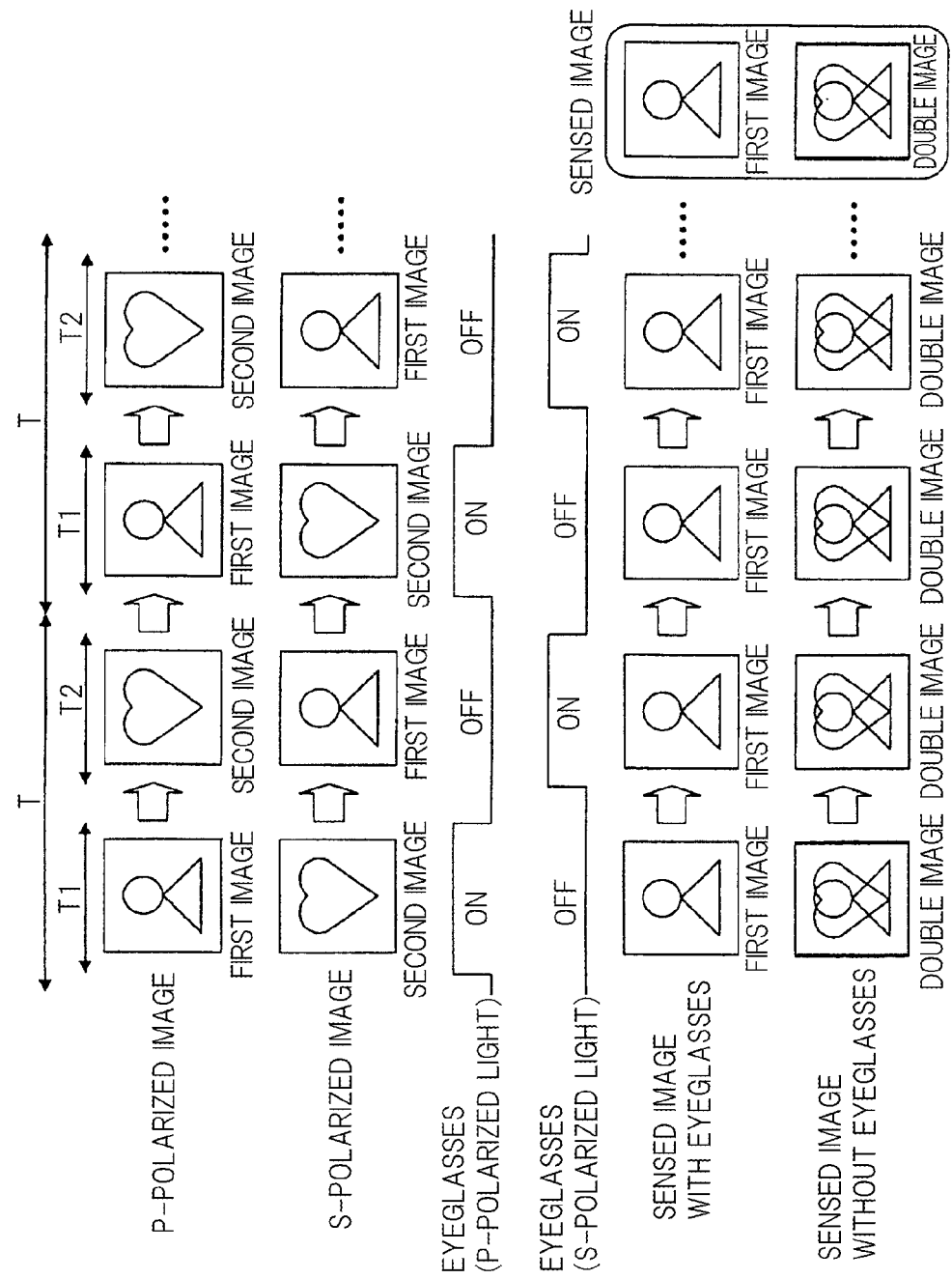
FIG. 14 is a diagram for explaining an example of a two-channel polarized light switching display performed in the image display system shown in FIG. 1.

An example of two-channel polarized light switching display for multiplex-displaying two images and switching polarization for each frame is shown in FIG. 14.

In the two-channel polarized light switching display, in display period T, first and second sub-frame periods T1 and T2 are provided. Display means 13 multiplex-displays the first image and the second image as P-polarized images in a time division manner and multiplex-displays the second image and the first image as S-polarized images in a time division manner.

In the following explanation, an operation performed when the first image is set as a selected channel image is explained.

In first sub-frame period T1, on display means 13, the first image is displayed by P-polarized light and the second image is displayed by S-polarized light. In first sub-frame period T1, optical shutter 14 transmits a P-polarized light component and blocks an S-polarized light component. In this case, only the first image as the P-polarized light displayed on display means 13 is transmitted through optical shutter 14. Therefore, in first sub-frame period T1, a sensed image obtained when optical shutter 14 is used is the first image (a sensed image with eyeglasses shown in FIG. 14). A sensed image obtained when optical shutter 14 is not used is a double image obtained by combining the first image and the second image as shown in a sensed image without eyeglasses.

In second sub-frame period T2, on display means 13, the second image is displayed by the P-polarized light and the first image is displayed by the S-polarized light. In second sub-frame period T2, optical shutter 14 transmits the S-polarized light component and blocks the P-polarized light component. Therefore, in second sub-frame period T2, as in first sub-frame period T2, a sensed image obtained when optical shutter 14 is used is the first image (the sensed image with eyeglasses shown in FIG. 14). A sensed image obtained when optical shutter 14 is not used is a double image obtained by combining the first image and the second image as shown in the sensed image without eyeglasses.

In display period T, a sensed image obtained when optical shutter 14 is used is an image obtained by temporally fusing the first image in first sub-frame period T1 and the first image in second sub-frame period T2. On the other hand, in display period T, a sensed image obtained when optical shutter 14 is not used is a double image obtained by temporally fusing a spatially combined image of the first and second images in first sub-frame period T1 and a spatially combined image of the first and second images in second sub-frame period T2.

When these states are set as one frame and are repeated at, for example, 60 Hz, as shown in a sensed image at the lower right in FIG. 14, an observer not wearing the eyeglasses of optical shutter 14 senses a double image obtained by superimposing the first image and the second image. On the other hand, an observer wearing the eyeglasses of optical shutter 14 can sense only the first image. In other words, the observer can select a channel of the first image.

When a display image of display means 13 is viewed through an optical filter that transmits only the P-polarized light, a double image obtained by temporally fusing the first and second images by the P-polarized light is sensed. When a display image of display means 13 is viewed using an optical filter that transmits only the S-polarized light, a double image obtained by temporally fusing the first and second images by the S-polarized light is sensed.

When one sub-frame is photographed by a camera to capture only an instance of the sub-frame, a double image obtained by combining the first image and the second image is photographed.

In other words, only the first image can be sensed in a case in which images are only viewed through optical shutter 14.

Therefore, with the image display system according to this exemplary embodiment, it is possible to provide a service for enabling only a person having optical shutter 14 to select and obtain desired image information from among a plurality of kinds of image information. Further, it is possible to make it difficult to photograph an image with a video camera or the like. Therefore, the image display system is also useful from the viewpoint of content protection.

(3) Multi-Channel Polarized Light Switching Display:

The polarized light switching display can be applied not only when the two images are multiplex-displayed but also when a larger number of images are multiplex-displayed.

In multi-channel polarized light switching display, in display period T, display means 13 multiplex-displays a plurality of images as P-polarized images in a time division manner and multiplex-displays another plurality of images as S-polarized image in a time division manner. Further, display means 13 alternately repeats, in every display period T, the display of the plurality of images as the P-polarized images and the display of the plurality of images as the S-polarized images.

Figure 15:
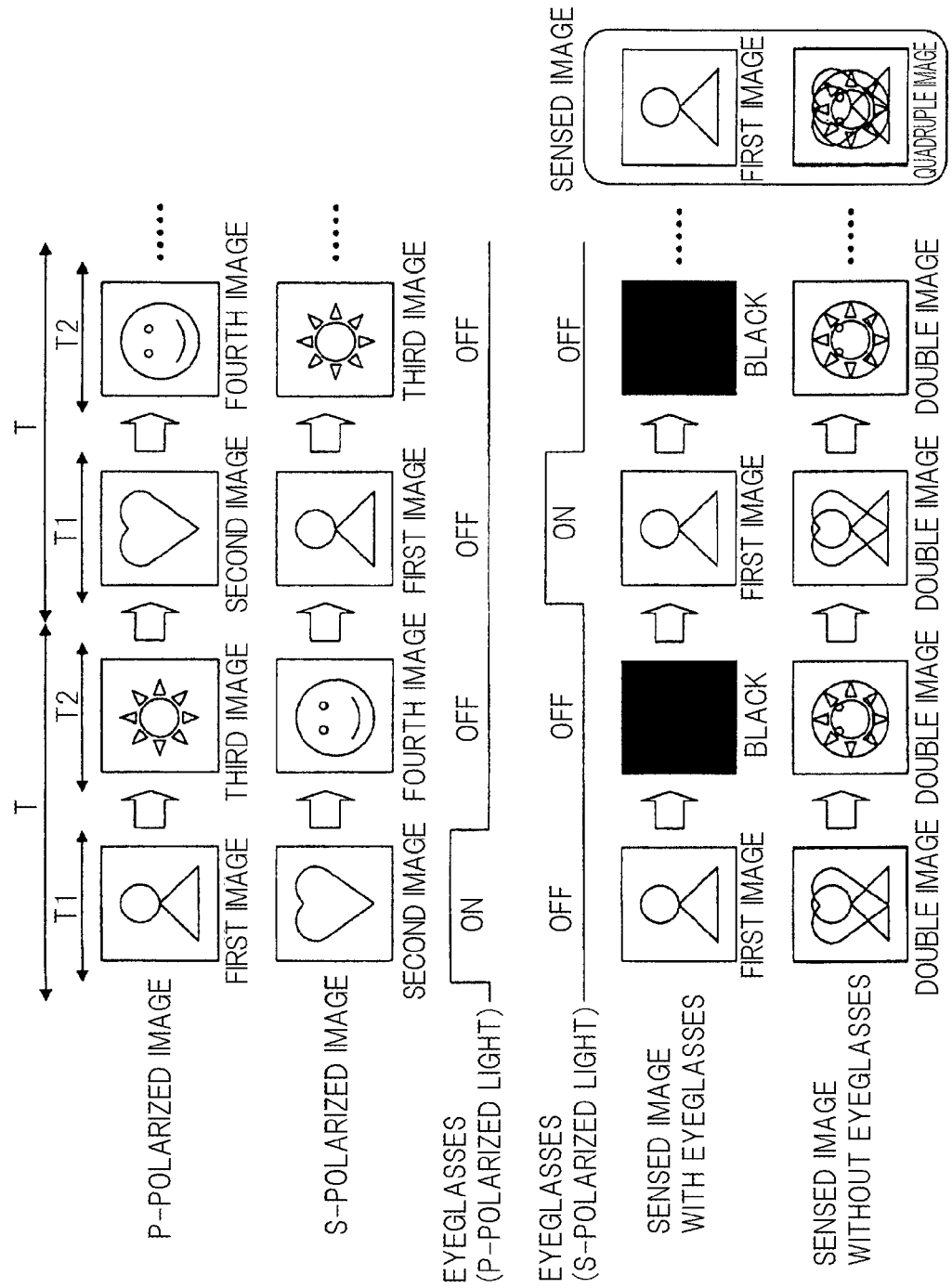
FIG. 15 is a diagram for explaining an example of a multi-channel polarized light switching display performed in the image display system shown in FIG. 1.

As an example of the multi-channel polarized light switching display, an example of four-channel polarized light switching display for multiplex-displaying four images and switching, in each frame, polarized light to be displayed is shown in FIG. 15.

In the example shown in FIG. 15, in display period T of display means 13, first and second sub-frame periods T1 and T2 are provided. Display means 13 multiplex-displays the first and third images as P-polarized images in a time division manner and multiplex-displays the second image and the fourth image as S-polarized images in a time division manner. In next display period T, display means 13 multiplex-displays the second image and the fourth image as P-polarized images in a time division manner and multiplex-displays the first image and the third image as S-polarized image in a time division manner. In this way, polarized light to be displayed of the four images is switched in every display period T.

In the following explanation, an operation performed when the first image is set as a selected channel image is explained.

In first display period T, a display operation explained below is performed.

In first sub-frame period T1, on display means 13, the first image is displayed by P-polarized light and the second image is displayed by S-polarized light. In first sub-frame period T1, optical shutter 14 transmits a P-polarized light component and blocks an S-polarized light component. In this case, only the first image as the P-polarized light displayed on display means 13 is transmitted through optical shutter 14. Therefore, in first sub-frame period T1, a sensed image obtained when optical shutter 14 is used is the first image (a sensed image with eyeglasses shown in FIG. 15). A sensed image obtained when optical shutter 14 is not used is a double image obtained by combining the first image and the second image as shown in a sensed image without eyeglasses.

In second sub-frame period T2, on display means 13, the third image is displayed by the P-polarized light and the fourth image is displayed by the S-polarized light. In second sub-frame period T2, optical shutter 4 blocks both the S-polarized light component and the P-polarized light component. Therefore, in second sub-frame period T2, a sensed image obtained when optical shutter 14 is used is a black image (the sensed image with eyeglasses shown in FIG. 15). A sensed image obtained when optical shutter 14 is not used is a double image obtained by combining the third image and the fourth image as shown in a sensed image without eyeglasses.

In second display period T, a display operation explained below is performed.

In first sub-frame period T1, on display means 13, the second image is displayed by the P-polarized light and the first image is displayed by the S-polarized light. In first sub-frame period T1, optical shutter 14 transmits the S-polarized light component and blocks the P-polarized light component. In this case, only the first image as the S-polarized light displayed on display means 13 is transmitted through optical shutter 14. Therefore, in first sub-frame period T1, a sensed image obtained when optical shutter 14 is used is the first image (the sensed image with eyeglasses shown in FIG. 15). A sensed image obtained when optical shutter 14 is not used is a double image obtained by combining the first image and the second image as shown in the sensed image without eyeglasses.

In second sub-frame period T2, on display means 13, the fourth image is displayed by the P-polarized light and the third image is displayed by the S-polarized light. In second sub-frame period T2, optical shutter 14 blocks both the S-polarized light component and the P-polarized light component. Therefore, in second sub-frame period T2, a sensed image obtained when optical shutter 14 is used is a black image (the sensed image with eyeglasses shown in FIG. 15). A sensed image obtained when optical shutter 14 is not used is a double image obtained by combining the third image and the fourth image as shown in the sensed image without eyeglasses.

In a combined period of two display periods T explained above, a sensed image obtained when optical shutter 14 is used is an image obtained by repeatedly temporally fusing the first image and the black image, i.e., the first image. On the other hand, a sensed image obtained when optical shutter 14 is not used is an image obtained by temporally fusing the first to fourth images, i.e., a quadruple image.

When these states are set as one frame and are repeated at, for example, 60 Hz, as shown in a sensed image at the lower right in FIG. 15, the observer not wearing the eyeglasses of optical shutter 14 senses a quadruple image obtained by superimposing the four images from the first image to the fourth image. On the other hand, the observer wearing the eyeglasses of optical shutter 14 can sense only the first image. In other words, the observer can select a channel of the first image.

When a display image of display means 13 is viewed using an optical filter that transmits only the P-polarized light or the S-polarized light, as explained above, an image obtained by temporally fusing the first to fourth images, i.e., a quadruple image is sensed. In other words, when the P-polarized light and the S-polarized light are switched to display the images in a time division manner, it is possible to make it more difficult to discriminate the images compared with the double image in the case of FIG. 2.

When one sub-frame is photographed by a camera to capture only an instance of the sub-frame, a double image obtained by combining the first image and the second image or a double image obtained by combining the third image and the fourth image is photographed. In other words, only the first image can be sensed in a case in which images are only viewed through optical shutter 14.

Therefore, with the image display system according to this exemplary embodiment, it is possible to provide a service for enabling only a person having optical shutter 14 to select and obtain desired image information from among a plurality of kinds of image information. Further, it is possible to make it difficult to photograph an image with a video camera or the like. Therefore, the image display system is also useful from the viewpoint of content protection.

(4) Random Display:

In the exemplary embodiments explained above, a plurality of images are respectively displayed in the same order in every display period. However, the present invention is not limited to this. Order for displaying the plurality of images may be changed at random in every display period. Naturally, it is also arbitrary to display the images as the P-polarized image or as the S-polarized image.

Figure 16:
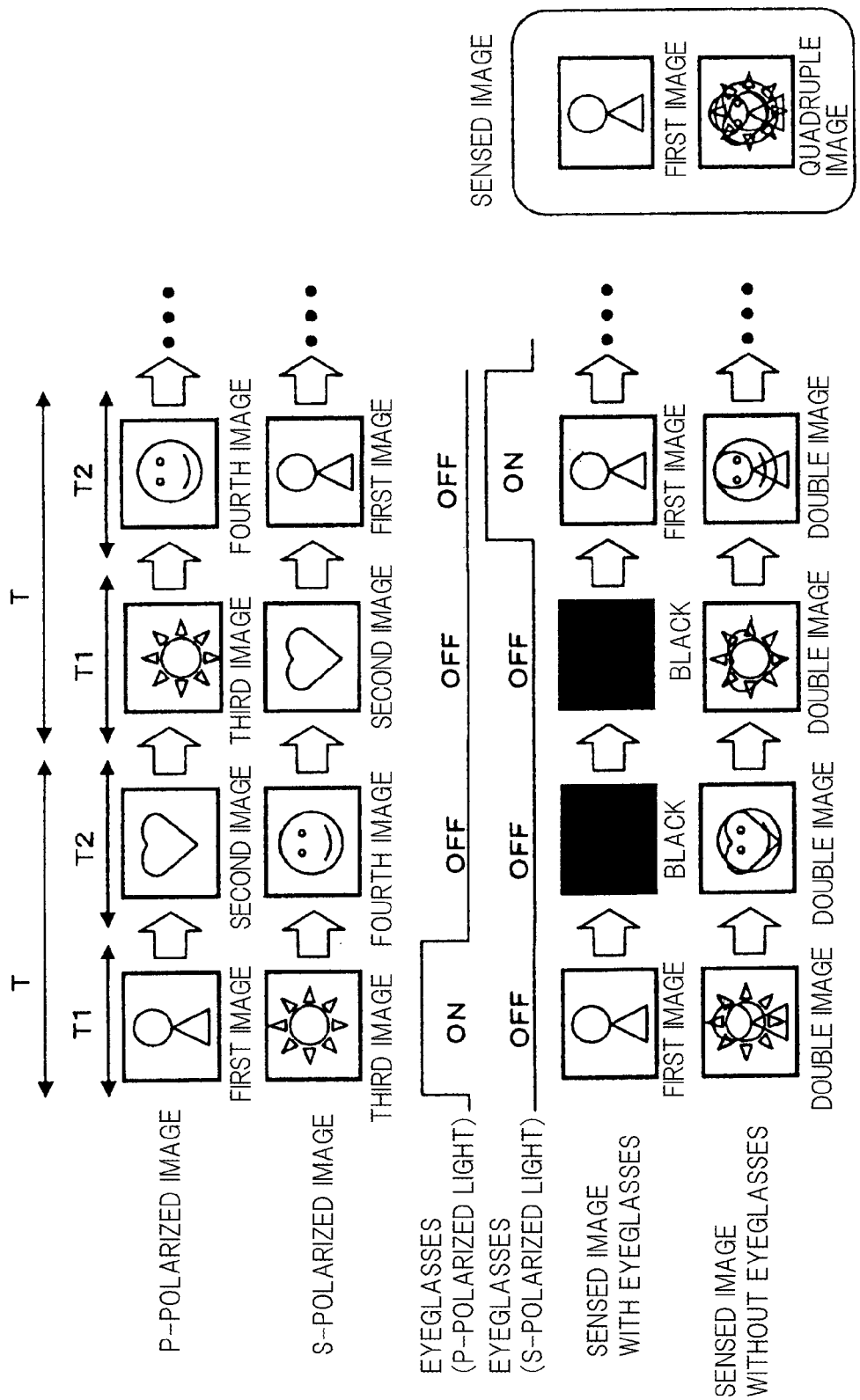
FIG. 16 is a diagram for explaining an example of a random display performed in the image display system shown in FIG. 1.

As an example of the random display, an example of random display for multiplex-displaying four images and switching display order and polarized light is shown in FIG. 16. In the example shown in FIG. 16, in display period T of display means 13, first and second sub-frame periods T1 and T2 are provided. Display means 13 multiplex-displays the first and second images as P-polarized images in a time division manner and multiplex-displays the third image and the fourth image as S-polarized images in a time division manner. In next display period T, display means 13 multiplex-displays the third image and the fourth image as P-polarized images in a time division manner and multiplex-displays the second image and the first image as S-polarized image in a time division manner. In this way, the display order and the polarized light are switched in each frame.

In the following explanation, an operation performed when the first image is set as a selected channel image is explained.

In first display period T, a display operation explained below is performed.

In first sub-frame period T1, on display means 13, the first image is displayed by P-polarized light and the third image is displayed by S-polarized light. In first sub-frame period T1, optical shutter 14 transmits a P-polarized light component and blocks an S-polarized light component. In this case, only the first image as the P-polarized light displayed on display means 13 is transmitted through optical shutter 14. Therefore, in first sub-frame period T1, a sensed image obtained when optical shutter 14 is used is the first image (a sensed image with eyeglasses shown in FIG. 16). A sensed image obtained when optical shutter 14 is not used is a double image obtained by combining the first image and the second image as shown in a sensed image without eyeglasses.

In second sub-frame period T2, on display means 13, the second image is displayed by the P-polarized light and the fourth image is displayed by the S-polarized light. In second sub-frame period T2, optical shutter 14 blocks both the S-polarized light component and the P-polarized light component. Therefore, in second sub-frame period T2, a sensed image obtained when optical shutter 14 is used is a black image (the sensed image with eyeglasses shown in FIG. 16). A sensed image obtained when optical shutter 14 is not used is a double image obtained by combining the second image and the fourth image as shown in a sensed image without eyeglasses.

In second display period T, a display operation explained below is performed.

In first sub-frame period T1, on display means 13, the third image is displayed by the P-polarized light and the second image is displayed by the S-polarized light. In first sub-frame period T1, optical shutter 14 blocks both the S-polarized light component and the P-polarized light component. Therefore, in first sub-frame period T1, a sensed image obtained when optical shutter 14 is used is a black image (the sensed image with eyeglasses shown in FIG. 16). A sensed image obtained when optical shutter 14 is not used is a double image obtained by combining the third image and the second image as shown in the sensed image without eyeglasses.

In second sub-frame period T2, on display means 13, the fourth image is displayed by the P-polarized light and the first image is displayed by the S-polarized light. In second sub-frame period T2, optical shutter 14 transmits the P-polarized light component and blocks the S-polarized light component. Therefore, in second sub-frame period T2, a sensed image obtained when optical shutter 14 is used is the first image (the sensed image with eyeglasses shown in FIG. 16). A sensed image obtained when optical shutter 14 is not used is a double image obtained by combining the fourth image and the first image as shown in the sensed image without eyeglasses.

In a combined period of two display periods T explained above, a sensed image obtained when optical shutter 14 is used is an image obtained by repeatedly temporally fusing the first image and the black image, i.e., the first image. On the other hand, a sensed image obtained when optical shutter 14 is not used is an image obtained by temporally fusing the first to fourth images, i.e., a quadruple image.

When these states are set as one frame and are repeated at, for example, 60 Hz, as shown in a sensed image at the lower right in FIG. 16, the observer not wearing the eyeglasses of optical shutter 14 senses a quadruple image obtained by superimposing the four images from the first image to the fourth image. On the other hand, the observer wearing the eyeglasses of optical shutter 14 can sense only the first image. In other words, the observer can select a channel of the first image.

When a display image of display means 13 is viewed using an optical filter that transmits only the P-polarized light or the S-polarized light, as explained above, an image obtained by temporally fusing the first to fourth images, i.e., a quadruple image is sensed. In other words, when the P-polarized light and the S-polarized light are switched to display the images in a time division manner, it is possible to make it more difficult to discriminate the images compared with the double image in the case of FIG. 2.

When one sub-frame is photographed by a camera to capture only an instance of the sub-frame, a double image obtained by combining the first image and the third image, a double image obtained by combining the second image and the fourth image, a double image obtained by combining the third image and the fourth image, or a double image obtained by combining the fourth image and the first image is photographed.

Further, since timing for displaying the first image is irregular, even if a polarization filter and a video camera are used, it is difficult to always photograph the first image.

In other words, only the first image can be sensed in a case in which images are only viewed through optical shutter 14.

Therefore, with the image display system according to this exemplary embodiment, it is possible to provide a service for enabling only a person having optical shutter 14 to select and obtain desired image information from among a plurality of kinds of image information. Further, it is possible to make it difficult to photograph an image with a video camera or the like. Therefore, there is also an effect that the image display system is also useful from the viewpoint of content protection.

(5) Multi-Channel Dispersion Display:

As a technique for preventing an image from being photographed using a camera, a dispersed image display is effective. In the dispersed image display, one image is decomposed into a plurality of images and temporally shifted to be displayed in different frames rather than being displayed in one frame. An observer can view an image completed by temporally fusing the plurality of images. On the other hand, when a frame at a certain instance is simply photographed using the camera, since only a part of the image can be photographed, a completed image cannot be obtained. As dispersed images, for example, there are images decomposed according to color components (decomposed images of color components of RGB), images decomposed on the basis of gradation characteristics, images decomposed according to a spatial pattern such as a checkered lattice, images decomposed according to dots, and images decomposed according to a combination of the color components, the gradation characteristics, the spatial pattern, and the dots.

When the dispersed images are displayed, since the decomposed images are displayed using a plurality of sub-frames, the dispersed images are effectively applied to a display system that can display a larger number of images as in the present invention. Further, in a multi-channel dispersion display for displaying a plurality of dispersed images while changing polarized light for each frame, a further effect can be obtained for photographing prevention.

In the multi-channel dispersion display, each of a plurality of images is decomposed into a plurality of dispersed images that form one completed image while being temporally fused, the respective dispersed images are allocated to a first polarized image and a second polarized image and the dispersed images of the different images are respectively multiplex-displayed in a time division manner concerning the first polarized image and the second polarized image.

Figure 17:
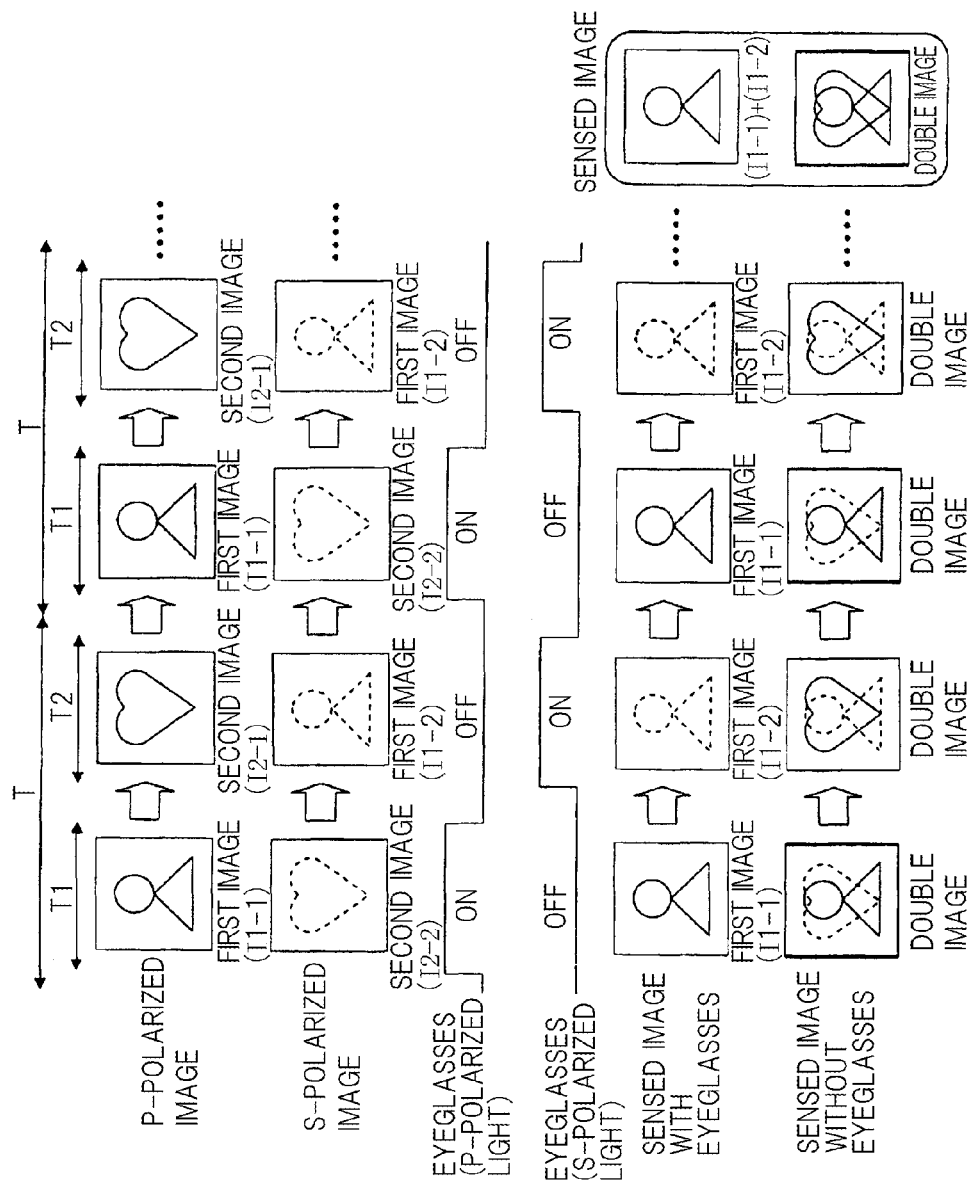
FIG. 17 is a diagram for explaining an example of a multi-channel dispersion display performed in the image display system shown in FIG. 1.

As an example of the multi-channel dispersion display, an example in which dispersed images of each of two images are multiplexed and displayed is shown in FIG. 17. In the example shown in FIG. 17, the first image is decomposed into a first image (I1-1) and a first image (I1-2). The second image is decomposed into a second image (I2-1) and a second image (I2-2). In display period T of display means 13, first and second sub-frame periods T1 and T2 are provided. Display means 13 switches polarized light to display dispersed images in each sub-frame in such a manner as multiplex-displaying the first image (I1-1) and the second image (I2-1) as P-polarized images in a time division manner and multiplex-displaying the second image (I2-2) and the first image (I1-2) as S-polarized images in a time division manner.

In first sub-frame period T1, on display means 13, the first image (I1-1) is displayed by P-polarized light and the second image (I2-2) is displayed by S-polarized light. In first sub-frame period T1, optical shutter 14 transmits a P-polarized light component and blocks an S-polarized light component. In this case, the first image (I1-1) as the P-polarized light displayed on display means 13 is transmitted through optical shutter 14. Therefore, in first sub-frame period T1, a sensed image obtained when optical shutter 14 is used is the first image (I1-1) (a sensed image with eyeglasses shown in FIG. 17). A sensed image obtained when optical shutter 14 is not used is a double image obtained by combining the first image (I1-1) and the second image (I2-2) (a sensed image without eyeglasses shown in FIG. 17).

In second sub-frame period T2, on display means 13, the second image (I2-1) is displayed by the P-polarized light and the first image (I1-2) is displayed by the S-polarized light. In second sub-frame period T2, optical shutter 14 transmits the S-polarized light component and blocks the P-polarized light component. In this case, only the first image (I1-2) as the S-polarized light displayed on display means 13 is transmitted through optical shutter 14. Therefore, in second sub-frame period T2, a sensed image obtained when optical shutter 14 is the first image (I1-2) (the sensed image with eyeglasses shown in FIG. 17). When optical shutter 14 is not used, a sensed image is a double image obtained by combining the first image (I1-2) and the second image (I2-1) (the sensed image without eyeglasses shown in FIG. 17).

In display period T, a sensed image obtained when optical shutter 14 is used is an image obtained by temporally fusing the first image (I1-1) in first sub-frame period T1 and the first image (I1-2) in second sub-frame period T2, i.e., the first image. On the other hand, a sensed image obtained when optical shutter 14 is not used is an image obtained by temporally fusing a spatially combined image of the first image (I1-1) and the second image (I2-2) in first sub-frame period T1 and a spatially combined image of the second image (I2-1) and the first image (I1-2) in second sub-frame period T2, i.e., a double image of the first image and the second image.

When these states are set as one frame and are repeated at, for example, 60 Hz, as shown in a sensed image at the lower right in FIG. 17, an observer not wearing the eyeglasses of optical shutter 14 senses a double image obtained by superimposing the two image images, the first image and the second image. On the other hand, an observer wearing the eyeglasses of optical shutter 14 can sense only the first image. In other words, the observer can select a channel of the first image.

When a display image of display means 13 is viewed using an optical filter that transmits only the P-polarized light, a double image obtained by temporally fusing the first image (I1-1) and the second image (I2-1) by the P-polarized light is sensed. When a display image of display means 13 is viewed using an optical filter that transmits only the S-polarized light, a double image obtained by temporally fusing the second image (I2-1) and the first image (I1-2) by the S-polarized light is sensed.

When one sub-frame is photographed by a camera to capture only an instance of the sub-frame, a double image obtained by combining the first image (I1-1) and the second image (I2-2) or a double image obtained by combining the first image (I1-2) and the second image (I2-1) is photographed.

Further, even if one of the polarized images at a certain instance is captured using a polarization filter and a camera, since the polarized image is a decomposed image, it is difficult to photograph a completed image. Similarly, even if a polarization filter and a video camera are used, since one image of dispersed images is displayed by different polarized light, it is more difficult to photograph a completed image.

In other words, only the first image can be sensed in a case in which images are only viewed through optical shutter 14.

Therefore, with the image display system according to this exemplary embodiment, it is possible to provide a service for enabling only a person having optical shutter 14 to select and obtain desired image information from among a plurality of kinds of image information. Further, it is possible to make it difficult to photograph an image with a video camera or the like. Therefore, the image display system is also useful from the viewpoint of content protection.

The display system according to this exemplary embodiment explained above is an example of the present invention. The configuration of the display system can be changed as appropriate without departing from the spirit of the invention.

In each display operation of the multi-channel display, the two-channel polarized light switching display, the multi-channel polarized light switching display, the random display, and the multi-channel dispersion display, it is also possible to combine the other operations.

Figure 18:
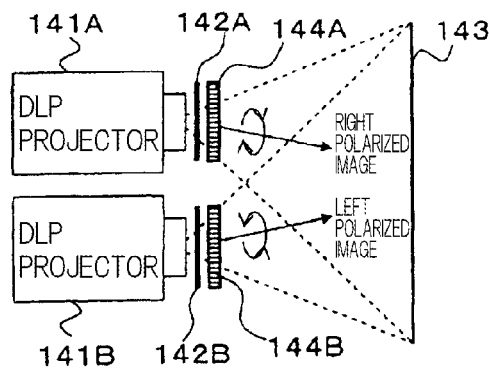
FIG. 18 is a schematic diagram showing an example of display means, in which a quarter-wave plate is used, included in the image display system shown in FIG. 1.
Figure 19:
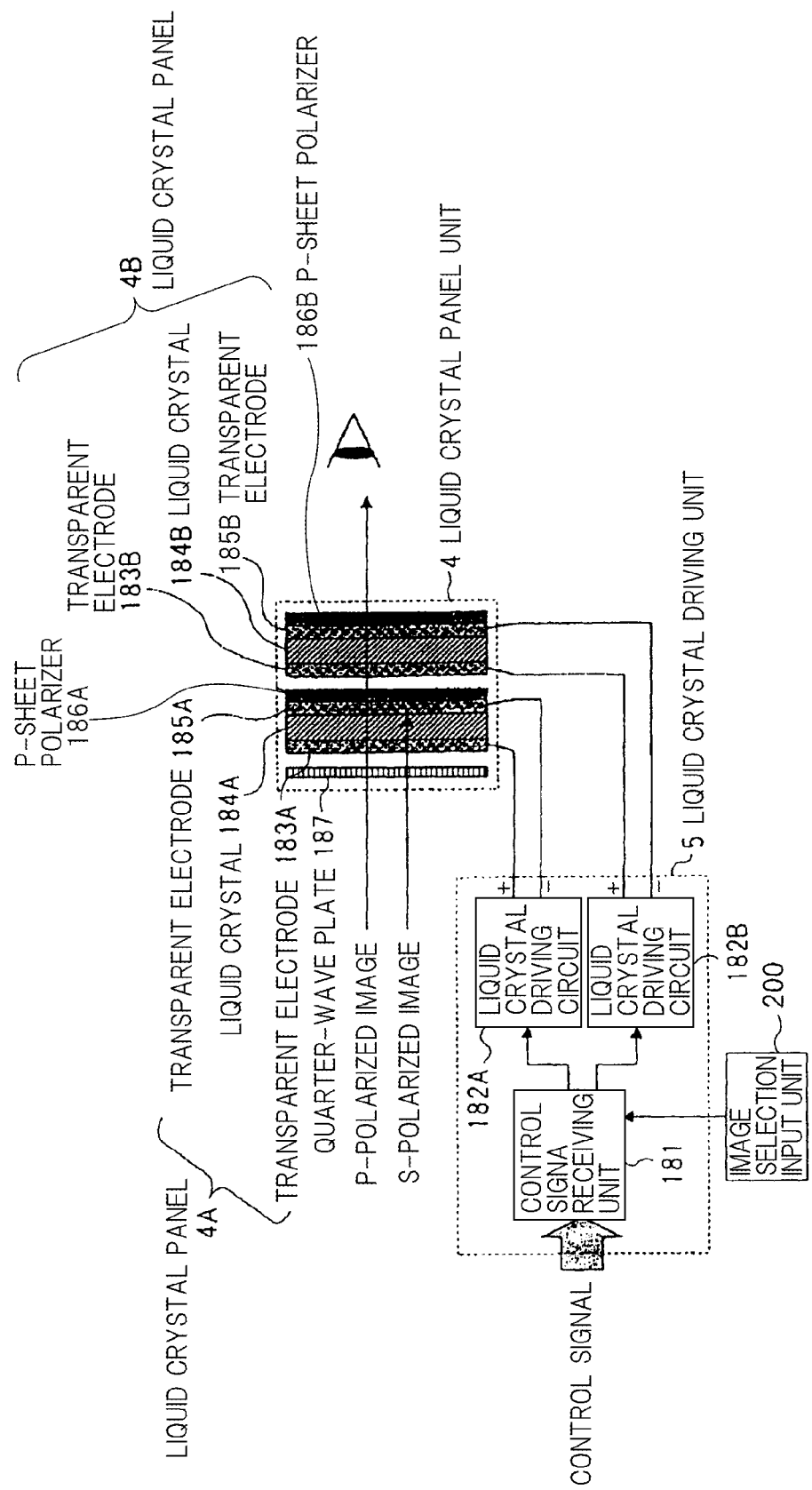
FIG. 19 is a block diagram showing an example of an optical shutter, in which a quarter-wave plate is used, included in the image display system shown in FIG. 1.

In the above explanation, the P-polarized image is used as the first polarized image and the S-polarized image is used as the second polarized Image. However, the present invention is not limited to this. The same configuration can be realized even if the S-polarized image is used as the first polarized image and the P-polarized image is used as the second polarized image. Circularly polarized light may be used instead of using the linear polarized light such as the P-polarized light and the S-polarized light. For example, a right-handed circularly polarized image may be used as the first polarized image and a left-handed circularly polarized image may be used as the second polarized image. It is more desirable to use circularly polarized light because optical shutter 14 can be used while being tilted with respect to display means 13 when the circularly polarized light is used compared with when linear polarized light is used. In this case, for example, as shown FIG. 18, quarter-wave plates 144A and 144B are respectively arranged on light exit surface sides of sheet polarizers 142A and 142B of display means 13 shown in FIG. 4 such that desired circularly polarized light can be obtained from linear polarized light. On the other hand, as shown in FIG. 19, quarter-wave plate 187 only has to be arranged on a light incidence surface side of optical shutter 14 shown in FIG. 9 to return circularly polarized light to desired linear polarized light. The same holds true concerning the other configurations.

The exemplary embodiments explained above are examples of the present invention. The configurations of the exemplary embodiments can be changed as appropriate.

The present invention has been explained with reference to the exemplary embodiments. However, the present invention is not limited to the exemplary embodiments explained above. Various modifications apparent to those skilled in the art can be made without departing from the spirit of the present invention.

According to the present invention, the first and second polarized images are spatially combined and displayed and a plurality of different images are multiplex-displayed in a time division manner concerning each of the first and second polarized images. Therefore, compared with the inventions described in Patent Literature 1 and the Patent Literature 2, it is possible to provide a large number of images and a specific observer can select desired information from among the images and observe the desired information.

This application claims priority based on Japanese Patent Application No. 2008-269962 filed on Oct. 20, 2008, the entire disclosure of which is incorporated herein.

The invention claimed is:

1. An image display system comprising:
a display unit that spatially combines a first polarized image generated by first polarized light and a second polarized image generated by second polarized light whose polarized light component is different from that of the first polarized light and that displays a combined polarized image;
a display control unit that causes the display unit to multiplex-display a plurality of different images in a time division manner concerning each of the first and second polarized images; and
an optical shutter that selectively transmits only a polarized image corresponding to a selected image arbitrarily selected from among the plurality of different images, wherein
the display control unit outputs a control signal that indicates timing of switching of the plurality of different images,
the optical shutter specifies a display period of the selected image on the basis of the control signal, and
the optical shutter transmits, of the first polarized light and the second polarized light, polarized light used for generation of the selected image and blocks the other polarized light in the display period of the selected image and blocks the first polarized image and the second polarized image in a period other than the display period of the selected image.

2. The image display system according to claim 1, wherein the display control unit causes the display unit to multiplex-display three or more different images in a time division manner in each of the first and second polarized images.

3. The image display system according to claim 1, wherein the display control unit switches, in each fixed display period, images multiplex-displayed as the first polarized image and images multiplex-displayed as the second polarized image.

4. The image display system according to claim 1, wherein the display control unit causes the display unit to display the plurality of different images at random as the first and second polarized images.

5. The image display system according to claim 1, wherein each of the plurality of different images includes a plurality of decomposed images that form one continuous image by being temporally fused, and
the display control unit causes the display unit to display the plurality of decomposed images while allocating the decomposed images to the first and second polarized images.

6. The image display system according to claim 1, wherein
the display unit displays, at different timings, a first display state in which a first image is displayed by the first polarized light and in which a second image different from the first image is displayed by the second polarized light and a second display state in which the second image is displayed by the first polarized light and in which the first image is displayed by the second polarized light, and
the optical shutter transmits the first polarized light and blocks the second polarized light in the first display state and transmits the second polarized light and blocks the first polarized light in the second display state.

7. An image control method comprising:
causing display unit that spatially combines a first polarized image generated by first polarized light and a second polarized image generated by second polarized light whose polarized light component is different from that of the first polarized light and that displays a combined polarized image to multiplex-display a plurality of different images in a time division manner concerning each of the first and second polarized images;
causing an optical shutter to selectively transmit only a polarized image corresponding to a selected image arbitrarily selected from among the plurality of different images; and
causing the optical shutter to transmit, of the first polarized light and the second polarized light, polarized light used for generation of the selected image and block the other polarized light in the display period of the selected image and block the first polarized image and the second polarized image in a period other than the display period of the selected image.

8. The image control method according to claim 7, further comprising the display unit to multiplex-display three or more different images in a time division manner in each of the first and second polarized images.

9. The image control method according to claim 7, further comprising switching, in each fixed display period, images multiplex-displayed as the first polarized image and images multiplex-displayed as the second polarized image.

10. The image control method according to claim 7, further causing the display unit to display the plurality of different images at random as the first and second polarized images.

11. The image control method according to claim 7, wherein
each of the plurality of different images includes a plurality of decomposed images that form one continuous image by being temporally fused, and
the image control method further comprises causing the display unit to display the plurality of decomposed images while allocating the decomposed images to the first and second polarized images.

12. The image control method according to claim 7, further comprising:
causing the display unit to display, at different timings, a first display state in which a first image is displayed by the first polarized light and in which a second image different from the first image is displayed by the second polarized light and a second display state in which the second image is displayed by the first polarized light and in which the first image is displayed by the second polarized light, and
causing the optical shutter to transmit the first polarized light and block the second polarized light in the first display state and transmit the second polarized light and block the first polarized light in the second display state.

13. An optical shutter comprising:
a liquid crystal panel unit in which switching of a state is performed among a first polarized light separation state in which first polarized light is transmitted and second polarized light whose polarized light component is different from that of the first polarized light is blocked, a second polarized light separation state in which the second polarized light is transmitted and the first polarized light is blocked, and a third polarized light separation state in which both the first polarized light and the second polarized light are blocked; and
a liquid crystal driving unit that controls, on the basis of a control signal supplied from an outside, the switching of the first to third polarized light separation states in the liquid crystal panel unit.

14. The optical shutter according to claim 13, wherein the liquid crystal panel unit includes:
a first liquid crystal panel for which switching of a first state in which incident light is transmitted while maintaining a polarization state thereof and a second state in which the polarization state of the incident light changes during transmission is possible;
a first sheet polarizer arranged on an exit surface side of the first liquid crystal panel;
a second liquid crystal panel for which the switching of the first and second states is possible; and
a second sheet polarizer arranged on an exit surface side of the second liquid crystal panel.

15. The optical shutter according to claim 14, wherein the liquid crystal panel unit further includes a quarter-wave plate arranged on an incidence surface side of the liquid crystal panel.

16. The optical shutter according to claim 13, further comprising an image selection input unit that selects an image that should be observed from among the plurality of different images, wherein
the liquid crystal driving unit specifies, on the basis of the control signal, a display period in which a selected image selected by the image selection input unit is displayed on display unit on an outside, transmits, of the first polarized light and the second polarized light, polarized light used for generation of the selected image, and blocks the other polarized light in the display period of the selected image.

17. The optical shutter according to claim 16, wherein the liquid crystal driving unit blocks the first polarized image and the second polarized image in a period other than the display period of the selected image.

18. An optical shutter comprising:
a liquid crystal panel unit in which switching of a state is performed between a first polarized light separation state in which first polarized light is transmitted and second polarized light whose polarized light component is different from that of the first polarized light is blocked and a second polarized light separation state in which the second polarized light is transmitted and the first polarized light is blocked;
a liquid crystal driving unit that controls, on the basis of a control signal supplied from an outside, the switching of the first and second polarized light separation states in the liquid crystal panel unit; and
an image selection input unit that selects an image that should be observed from among the plurality of different images,
wherein the control signal indicates timing of switching of an image and indicates a polarization direction of the image,
wherein the liquid crystal driving unit specifies, on the basis of the control signal, a display period in which a selected image selected by the image selection input unit is displayed on display unit on an outside, transmits, of the first polarized light and the second polarized light, polarized light used for generation of the selected image, and blocks the other polarized light in the display period of the selected image, and
wherein the liquid crystal driving unit blocks the first polarized image and the second polarized image in a period other than the display period of the selected image.

* * * * *